(12) United States Patent
Simard et al.

(10) Patent No.: US 12,698,104 B1
(45) Date of Patent: Aug. 4, 2026

(54) SPACECRAFT ANTENNA RESTRAINT SYSTEM

(71) Applicant: Space Exploration Technologies Corp., Hawthorne, CA (US)

(72) Inventors: Garrett P. Simard, Seattle, WA (US); Stefano A. Bauk, Redmond, WA (US); Robert D. Giglio, Seattle, WA (US); Andrew C. Thompson, Hebron, CT (US); Joshua A. Dunford, Kirkland, WA (US)

(73) Assignee: Space Exploration Technologies Corp., Starbase, TX (US)

( * ) Notice: Subject to any disclaimer, the term of this patent is extended or adjusted under 35 U.S.C. 154(b) by 223 days.

(21) Appl. No.: 17/094,441

(22) Filed: Nov. 10, 2020

Related U.S. Application Data

(60) Provisional application No. 63/022,311, filed on May 8, 2020.

(51) Int. Cl.
| | |
|---|---|
| *B64G 1/66* | (2006.01) |
| *H01Q 3/08* | (2006.01) |
| *H01Q 1/28* | (2006.01) |

(52) U.S. Cl.
CPC .................. *B64G 1/66* (2013.01); *H01Q 3/08* (2013.01); *H01Q 1/288* (2013.01)

(58) Field of Classification Search
CPC ............. B64G 1/66; H01Q 3/08; H01Q 1/288
See application file for complete search history.

(56) References Cited

U.S. PATENT DOCUMENTS

| | | | |
|---|---|---|---|
| 4,561,614 A | 12/1985 | Olikara et al. | |
| 4,854,526 A | 8/1989 | Rochefort | |
| 5,052,640 A | 10/1991 | Chang | |
| 5,522,569 A | 6/1996 | Steffy et al. | |
| 5,810,296 A * | 9/1998 | Izumi ................... | B64G 1/2228 |
| | | | 244/172.9 |
| 5,833,176 A | 11/1998 | Rubin et al. | |
| 8,720,830 B1 | 5/2014 | Szatkowski | |
| 10,351,268 B2 | 7/2019 | Estevez et al. | |
| 10,717,551 B2 | 7/2020 | Estevez et al. | |
| 10,957,986 B2 * | 3/2021 | Baghdasarian .......... | H01Q 3/08 |
| 11,787,572 B1 | 10/2023 | Thompson et al. | |
| 11,834,205 B1 * | 12/2023 | Dunford ................. | B64G 1/58 |
| 11,878,820 B1 | 1/2024 | Thompson et al. | |
| 11,958,638 B1 | 4/2024 | Ratcliff et al. | |
| 2007/0200780 A1 * | 8/2007 | Hentosh ................... | H01Q 3/08 |
| | | | 343/757 |
| 2008/0149776 A1 * | 6/2008 | Benedict ................ | B64G 1/641 |
| | | | 403/321 |
| 2011/0113605 A1 * | 5/2011 | Plaza Baonza ........ | B64G 1/645 |
| | | | 24/591.1 |
| 2016/0264264 A1 * | 9/2016 | Helmer .................. | B64G 1/222 |

(Continued)

*Primary Examiner* — Mi'schita' Henson
(74) *Attorney, Agent, or Firm* — Polsinelli PC

(57) ABSTRACT

A spacecraft system may include a first spacecraft having a chassis and a first antenna moveably mounted to the chassis, and a second spacecraft having a chassis, wherein the second spacecraft is adjacent the first spacecraft during launch to define a stacked configuration, and a passive restraint system defined between the first and second spacecraft that is configured to substantially prevent movement of the first antenna in a launch position while in a launch state when the first and second spacecraft are in a stacked configuration.

17 Claims, 19 Drawing Sheets

(56) References Cited

U.S. PATENT DOCUMENTS

| | | | |
|---|---|---|---|
| 2016/0318635 A1 | 11/2016 | Field et al. | |
| 2017/0355474 A1 | 12/2017 | Busche | |
| 2018/0111707 A1 | 4/2018 | Poncet et al. | |
| 2018/0162561 A1 | 6/2018 | Estevez et al. | |
| 2018/0175931 A1* | 6/2018 | Ferrando | H01Q 1/288 |
| 2020/0024010 A1 | 1/2020 | Estevez et al. | |
| 2025/0206469 A1* | 6/2025 | McEntee | B64G 1/223 |

* cited by examiner

SPACECRAFT ANTENNA RESTRAINT SYSTEM

CROSS-REFERENCE TO RELATED APPLICATIONS

The present application claims priority to U.S. Provisional Patent Application No. 63/022,311 filed May 8, 2020 entitled "SPACECRAFT ANTENNA SYSTEM," the contents of which is hereby incorporated by reference in its entirety.

BACKGROUND

To reduce launch costs, many launch vehicles (or rockets) used to carry a payload into outer space have been designed to simultaneously carry a plurality of spacecraft such as, for example, a plurality of satellites. In one approach, the launch vehicle includes a dedicated dispenser system, which separately supports each spacecraft during lift-off and then individually dispenses each spacecraft in orbit. However, such a system tends to be bulky and heavy, which reduces the useable payload that can be carried into orbit by the launch vehicle.

In another approach, a system for deploying spacecraft from a launch vehicle may include securing one or more spacecraft in layers in a stack, where each spacecraft in each layer is releasably secured to adjacent layers of one or more spacecraft, and a controller is used to release, layer by layer, each spacecraft. In such an approach, releasable fasteners may be used to secure the layers of spacecraft together, and biasing devices can be used to help facilitate separation of the layers and/or to cause the spacecraft to rotate when released from the stack. Such a system, although less heavy and bulky, is complicated to install and control.

Therefore, there exists a need for a simplified system for stacking and releasing spacecraft, such as satellites, for independent flight. Embodiments of the present disclosure are directed to solving this and other problems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a spacecraft system includes a first spacecraft having a chassis and a first antenna moveably mounted to the chassis, a second spacecraft having a chassis, wherein the second spacecraft is adjacent the first spacecraft during launch to define a stacked configuration, and a passive restraint system defined between the first and second spacecraft that is configured to substantially prevent movement of the first antenna in a launch position while in a launch state when the first and second spacecraft are in a stacked configuration.

In another aspect, a first spacecraft, which is configured to be positioned adjacent a second spacecraft in a stacked configuration includes a chassis, a first antenna moveably mounted to the chassis, and a passive restraint system configured to substantially prevent movement of the first antenna in a launch position while in a launch state when the first spacecraft is positioned adjacent the second spacecraft in a stacked configuration.

In another aspect, an antenna system of a spacecraft includes a multi-axis gimbal having at least one drive motor, a panel mounted to the multi-axis gimbal, a parabolic antenna mounted to the panel, and at least one support member extending from the panel that is configured to engage a portion of an adjacently positioned antenna system.

In another aspect, a method of launching and releasing spacecraft from a rocket includes orienting a first antenna of a first spacecraft in a launch position, arranging a second spacecraft adjacent to the first spacecraft to define a stacked spacecraft configuration in the rocket, launching the rocket, substantially preventing movement of the first antenna in a launch state, and deploying the first and second spacecraft from the stack into space to allow movement of the first antenna into a deployed position.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
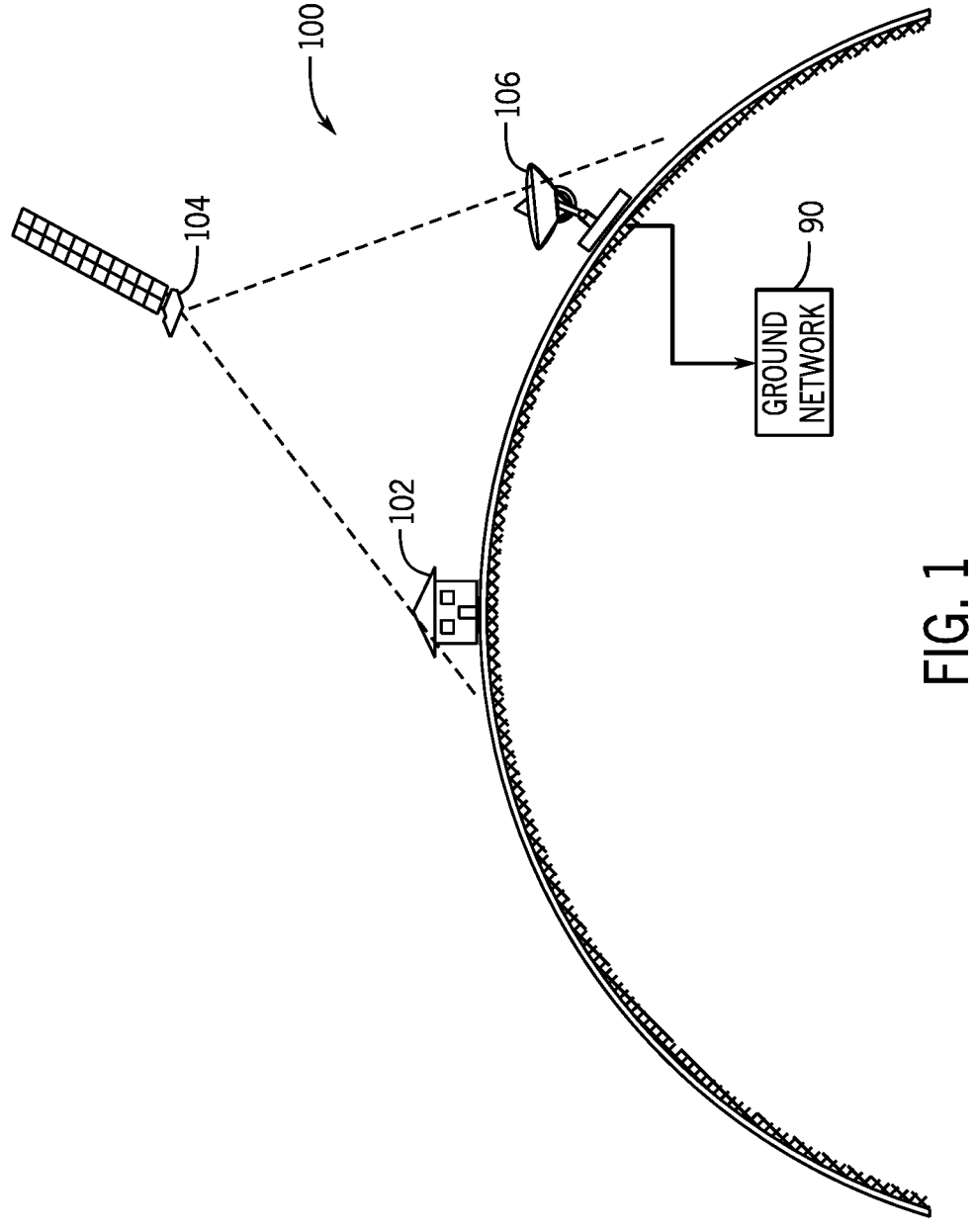
FIG. 1 is a schematic diagram of an example satellite communication system.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "top", "bottom", "vertical", "horizontal", and "lateral" in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Systems are currently being deployed in order to provide high-bandwidth, low-latency network communication via constellations of satellites in low Earth orbit. FIG. 1 is a not-to-scale schematic diagram that illustrates a simple example of communication in such a system 100. An endpoint terminal 102 is installed at a house, a business, a vehicle, or another location where it is desired to obtain communication access via the satellite network. A communication path is established between the endpoint terminal 102 and a first satellite 104. The first satellite 104, in turn, establishes a communication path with a gateway terminal 106. The gateway terminal 106 is physically connected via fiber optic, Ethernet, or another physical connection to a ground network 90. The ground network 90 may be any type of network, including the Internet.

Latency of communication between the endpoint terminal 102 and the ground network 90 is determined at least in part by the distance between the endpoint terminal 102 and the satellite 104, and the distance between the satellite 104 and the gateway terminal 106. For previous satellite communication systems that used satellites in geosynchronous or geostationary Earth orbit (GEO), the large distances involved created high amounts of latency. Therefore, it is desirable to use constellations of satellites in low Earth orbit (LEO) instead.

Embodiments of the present disclosure are directed to spacecraft chassis layouts including the antenna systems and configurations to optimize network communications to and from the satellite for LEO applications or other suitable applications. In particular, the exemplary embodiments disclosed herein relate to Ka band antenna systems and configurations.

Spacecraft System

Referring to FIGS. 2-11, exemplary embodiments for the stacking of the satellites for launch will now be described.

Figure 2:
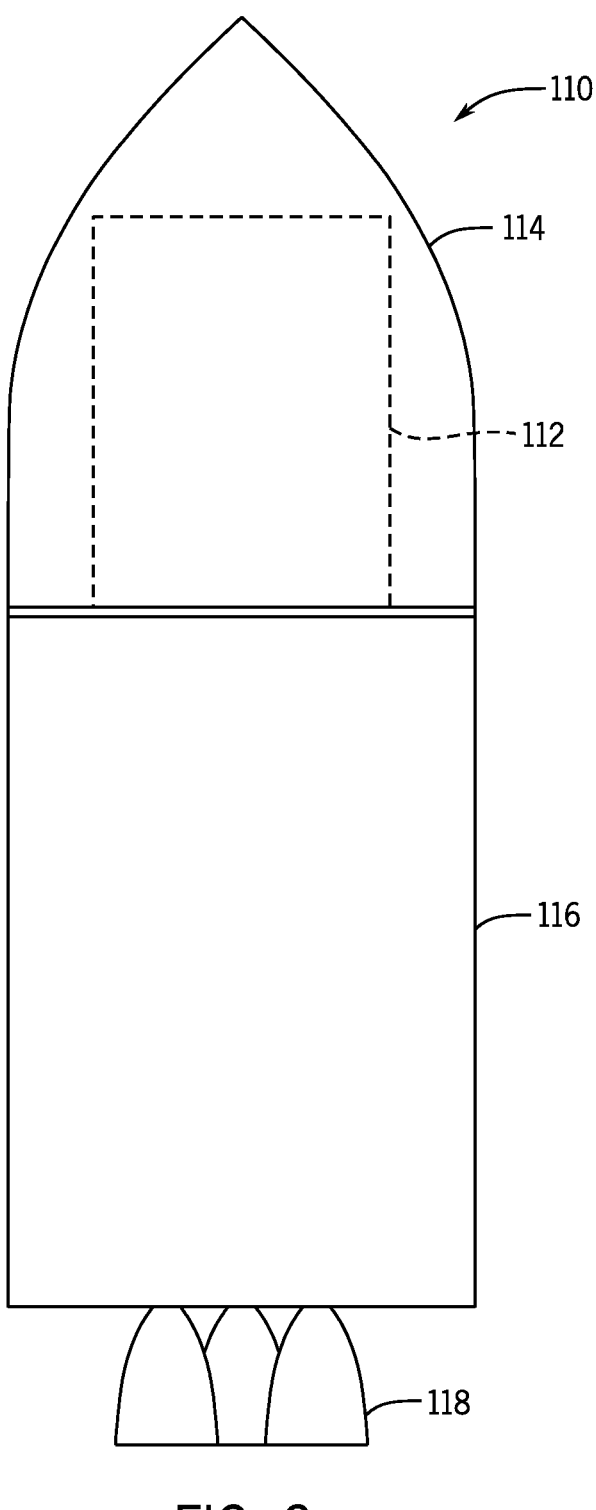
FIG. 2 is a simplified diagram of a rocket and a spacecraft system disposed within a rocket according to one embodiment of the present disclosure.

FIG. 2 depicts a rocket 110 including an exemplary spacecraft system 112 secured inside a fairing 114 coupled to a launch vehicle 116. The launch vehicle 116 provides a rocket engine for propelling the rocket 110 during launch and/or flight. For example, the launch vehicle 116 can include one or more internal fuel chambers containing a rocket fuel (i.e., a propellant), combustion chambers, and/or rocket engine nozzles 118. The rocket fuel combusts in the combustion chamber to produce hot, high pressure gas, which the rocket engine nozzle 118 exhausts away from the launch vehicle 116. The rocket engine nozzle 118 can accelerate the gas received from the combustion chamber to facilitate converting thermal energy of the gas into kinetic energy of the launch vehicle 116. The launch vehicle 116 may include a single engine stage or a plurality of engine stages, which separate and ignite in sequence.

The fairing 114 is coupled to the launch vehicle 116 and encloses the spacecraft system 112 to protect the spacecraft system 112 from aerodynamic forces during flight through an atmosphere. The fairing 114 can then separate from the launch vehicle 116 after the aerodynamic forces drop below a certain value and/or the launch vehicle 116 reaches a particular location. By separating the fairing 114 from the launch vehicle 116, the spacecraft system 112 can be exposed to an external environment such as, for example, outer space. The spacecraft system 112 can then deploy into orbit a plurality of spacecraft such as, for example, satellites and/or interplanetary probes, as shown and described herein.

Spacecraft Stacking Assembly

Figure 3:
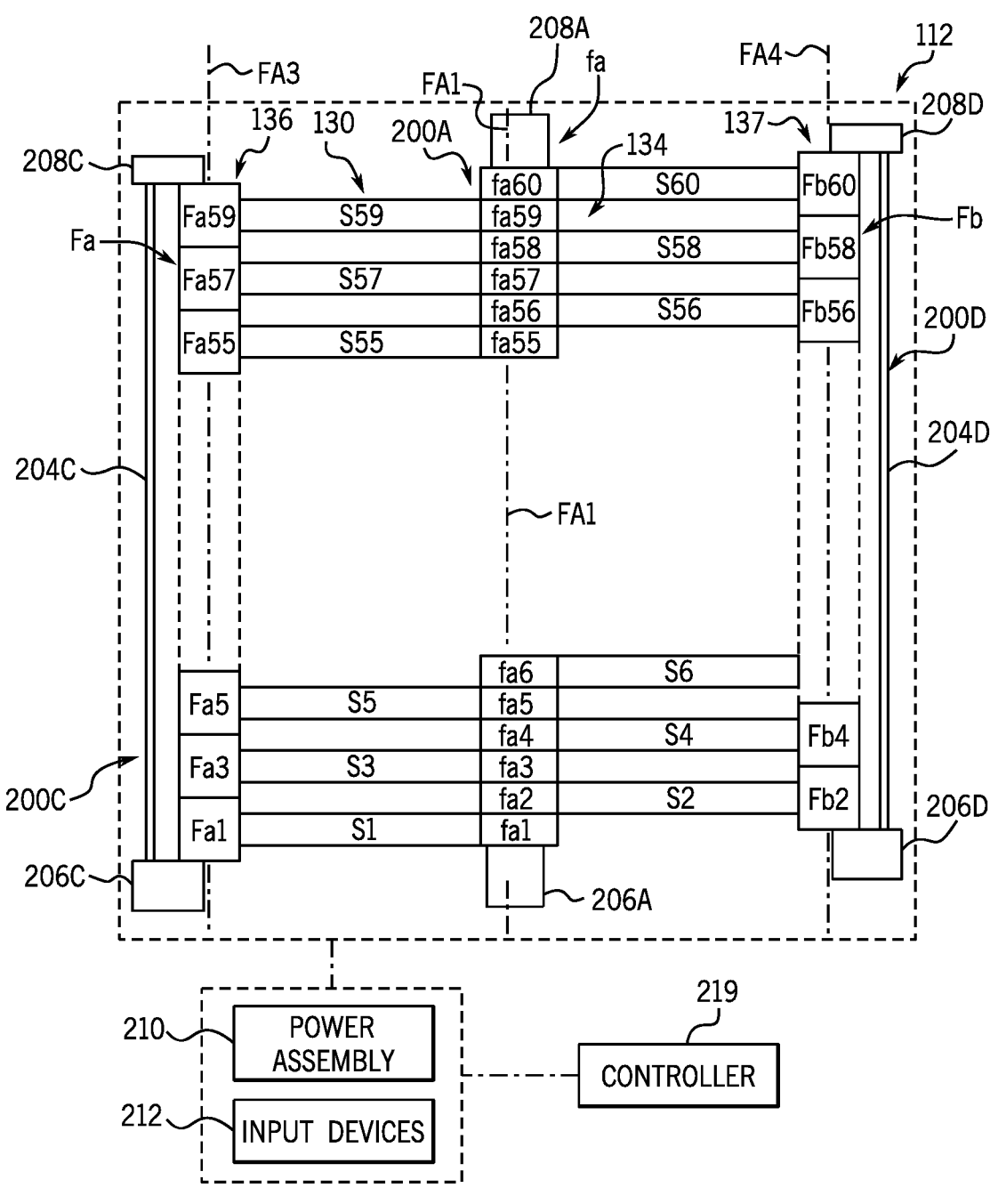
FIG. 3 is a simplified schematic diagram of the spacecraft system of FIG. 2.

FIG. 3 depicts a schematic of the spacecraft system 112 having plurality of satellites in a stacked configuration disposed within a payload fairing of a launch vehicle. The plurality of satellites include at least one bottom or aft satellite disposed vertically below at least one top or forward satellite, wherein the satellites bear the launch load, and a structure extending along the length of the stack releasably secures the satellites in the stacked configuration and releasably secures the stack to a payload adaptor (see adaptor 140) of the launch vehicle 116.

In the depicted example, a stack 130 includes sixty satellites S1-S60, with thirty satellites defining a first half of the stack, and with the remaining thirty satellites defining the second half of the stack in an overall substantially rectangular configuration. The first half of the stack includes satellites S1, S3, . . . , S55, S57, S59, stacked vertically on top of one another, and the second half of the stack includes satellites S2, S4, . . . , S56, S58, S60, stacked vertically on top of one another. The satellites are stacked such that the satellites in the second half of the stack are vertically offset from the satellites in the first half of the stack by the height of a single satellite. In other words, the stack 130 is arranged with vertically stacked satellites in a side by side stepped configuration. Each "layer" of the stack can be considered to include one satellite (a single step of the stack) or two satellites (two steps of the stack). It should be appreciated that the exemplary stack 130 depicted may instead have many other configurations, such as a different number or arrangement of satellites, a different type of spacecraft, etc., without departing from the scope of the claimed subject matter.

The satellites are releasably secured in a side-by-side, stepped stacked configuration through a suitable satellite separation fitting system. In general, the satellite separation fitting system is configured to releasably mate the layered satellites such that they passively release into orbit when released from the rocket while defining a primary load path(s) for the stack 130.

Figure 4:
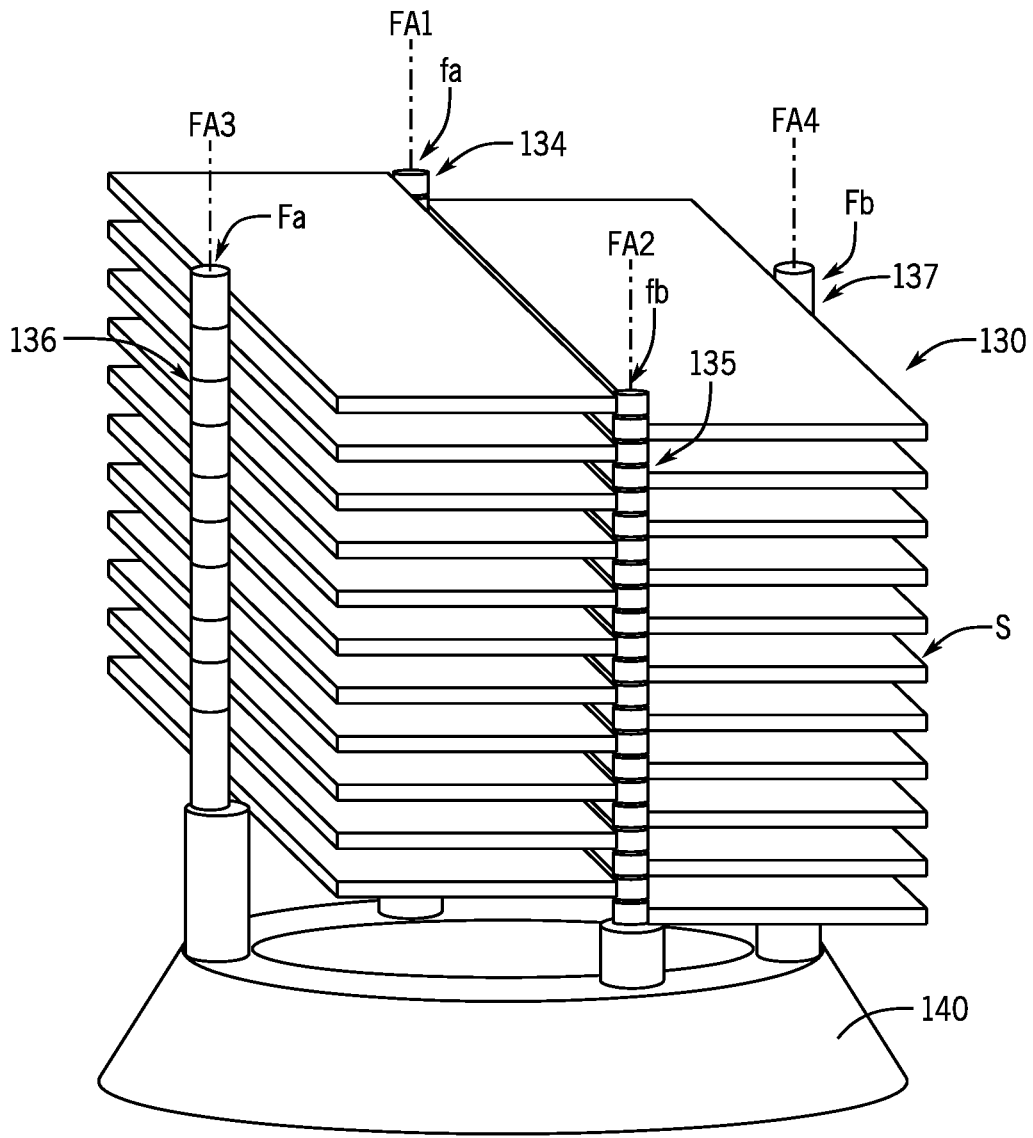
FIG. 4 is an isometric view of an exemplary spacecraft system according to the principles schematically represented in FIG. 3.

Referring additionally to FIG. 4, where less than 60 satellites S are shown for simplicity, the satellite separation fitting system may include first and second demi-separation fitting assemblies fa and fb configured to releasably mate satellites S1, S3, . . . S59 stacked in a first half of the stack 130 to stepped satellites S2, S4, . . . S60 stacked in a second half of the stack. In general the first and second demi-separation fitting assemblies fa and fb releasably mate the stepped satellites together at their stepped interface on opposite sides of the stack 130.

The first demi-separation fitting assembly fa is defined by a first stack of demi-separation fittings fa1-fa60 extending laterally from a first corner of the respective satellite S1-S60 toward the center of the stack 130. In particular, demi-separation fittings fa1, fa3, . . . fa59 of corresponding satellites S1, S3, . . . , and S59 in a first half of the stack 130 are configured to releasably mate with the demi-separation fittings fa2, fa4, . . . fa60 of corresponding satellites S2, S4, . . . , and S60 in a second half of the stack 130. The demi-separation fittings fa1, fa2, fa3, fa4, . . . fa58, fa59, fa60 stack in an alternating fashion to define an aligned column of demi-separation fittings fa1-fa60. The stacked demi-separation fittings fa1-fa60 of the first demi-separation fitting assembly fa define a first load column 134 for the stack 130 having a first fitting axis FA1 along which load passes during launch of the rocket.

Similarly, the second demi-separation fitting assembly fb is defined by a second stack of demi-separation fittings fb1-fb60 extending laterally from a second corner of the respective satellites S1-S60 along the same elongated edge of the satellite S and toward the center of the stack 130. In particular, demi-separation fittings fb1, fb3, . . . fb59 of corresponding satellites S1, S3, . . . , and S59 in the first half of the stack 130 are configured to releasably mate with the demi-separation fittings fb2, fb4, . . . fb60 of corresponding satellites S2, S4, . . . , and S60 in the second half of the stack 130. The demi-separation fittings fb1, fb2, fb3, fb4, . . . fb58, fb59, fb60 stack in an alternating fashion to define an aligned column of demi-separation fittings fb1-fb60. The stacked demi-separation fittings fb1-fb60 of the second demi-separation fitting assembly fb define a second load column 135 for the stack 130 having a second fitting axis FA2 along which load passes during launch of the rocket. The second load column 135 would be in front of the first load column 134 in the schematic shown in FIG. 3.

The first and second demi-separation fitting assemblies fa and fb may be configured to support any suitable stacked, stepped satellite arrangement other than what is shown. Moreover, although first and second demi-separation fitting assemblies fa and fb are shown interposed between stepped satellites, fewer that one or more than two demi-separation fitting assemblies may instead be used.

In the depicted exemplary embodiment of FIG. 3, the satellite separation fitting system may further include first and second full height separation fitting assemblies Fa and Fb configured to releasably mate the satellites at third and fourth locations on opposite sides of the stack 130. In that regard, the separation fitting assemblies fa, fb, Fa, and Fb are defined at first, second, third, and fourth substantially equally spaced locations about the rectangular stack 130.

The first full height separation fitting assembly Fa is defined by a stack of full height separation fittings Fa1, Fa3, . . . Fa57, Fa59 extending from the elongated edge of the corresponding satellite S1, S3, . . . S57, S59 opposite the elongated edge from which the demi-height separation fitting assemblies fa1/fb1, fa3/fb3, . . . fa57/fb57, and fa59/fb59 extend. Similarly, the second full height separation fitting assembly Fb is defined by a stack of full height separation fittings Fb2, Fb4, . . . Fb58, Fb60 extending from the elongated edge of the corresponding satellite S2, S4, . . . S58, S60 opposite the elongated edge from which the demi-height separation fitting assemblies fa2/fb2, fa4/fb4, . . . fa58/fb58, and fa60/fb60 extend. It should be appreciated that the stack separation fitting system may instead include only one or more than two full height separation fitting assemblies on the same or different edge of the satellite S.

For each full height separation fitting assembly Fa and Fb, the full height separation fitting of a first, bottom satellite is sized and configured to releasably mate with the full height stack separation fitting of an adjacently positioned second, top (and possibly third, bottom) satellite. For instance, in the first half of the stack, the full height stack separation fitting Fa3 of satellite S3 is sized and configured to releasably mate with full height stack separation fitting Fa1 of satellite S1 and with the full height separation fitting Fa5 of satellite S5. Similarly, in the second half of the stack, the full height stack separation fitting Fb4 of satellite S4 is sized and configured to releasably mate with full height stack separation fitting Fb2 of satellite S2 and with the full height separation fitting Fb6 of satellite S6.

The stacked full height separation fittings Fa1, Fa3, . . . Fa57, Fa59 and Fb2, Fb4, . . . Fb58, Fb60 of the first and second full height separation fitting assemblies Fa and Fb define third and fourth load columns 136 and 137 on each side of the stack 130. The third and fourth load columns 136 and 137 define third and fourth fitting axes FA3 and FA4, respectively, along which load passes during launch of the rocket.

As noted above, the separation fitting assemblies fa, fb, Fa, and Fb are defined at first, second, third, and fourth substantially equally spaced locations about the rectangular stack 130. In that regard, the releasably mated stack separation fittings of the stacked satellites define first, second, third, and fourth equally spaced load columns 134, 135, 136, and 137 for the substantially rectangular stack 130. The evenly spaced arrangement of the load columns 134, 135,

136, and 137 substantially distributes the load evenly along the stack 130 during launch. In that regard, in addition to stacking the satellites such that they passively release into orbit when released from the rocket, the stacked satellites themselves define the primary structure of the stack 130, with the load columns 134, 135, 136, and 137 defining the load paths. The columns may also define a grounding path for the stack 130 to the rocket 110.

Figure 5:
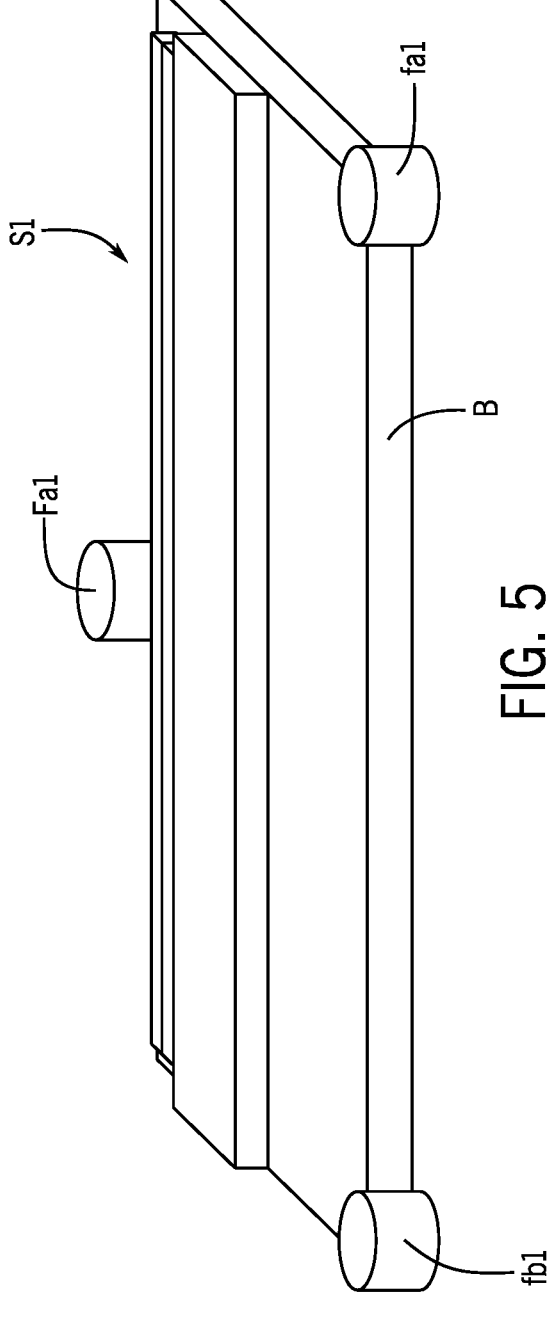
FIG. 5 is an isometric view of an exemplary embodiment of a spacecraft for use in the spacecraft system shown in FIG. 4.

Referring to FIGS. 4-6, 7A, and 7B, an exemplary embodiment of a separation fitting assembly configured to releasably mate the stepped satellites together such that they passively release into orbit and define a load column when stacked will now be described in more detail. FIG. 5 depicts a first satellite S1 having a substantially rectangular body B, with first and second demi-separation fittings fa1 and fb1 secured to opposite corners of one edge of the body B, and a full height separation fitting Fa1 secured to the body B in substantially the middle of the opposite edge (such as with bolts or other fasteners).

Each separation fitting is substantially identical, with the exception that the demi-separation fittings fa1 and fb1 are about half the height of the full height separation fitting Fa1 to accommodate the alternating stepped configuration of the stacked satellites, as described above and as further shown in FIG. 4. In that regard, only the first demi-separation fitting f1*a* will be described in detail.

Figure 6:
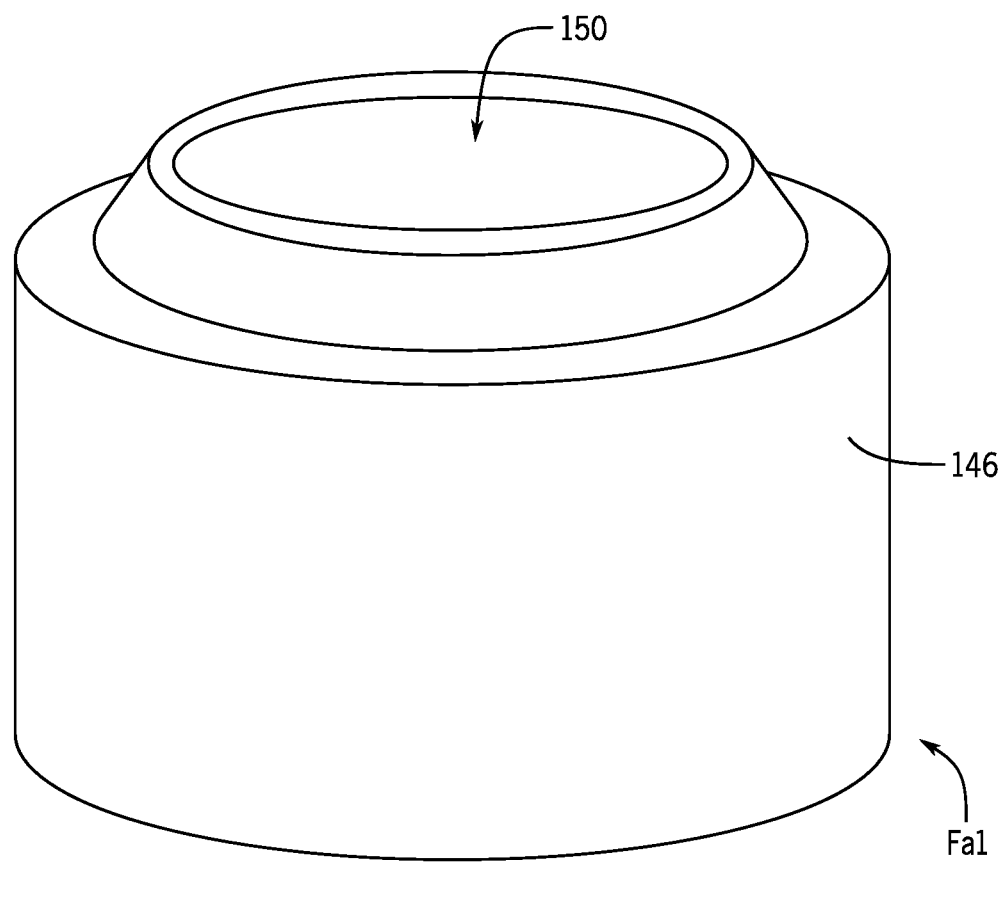
FIG. 6 is an isometric view of a separation fitting for use with the stacked configuration of spacecraft shown in FIG. 4.
Figure 7A:
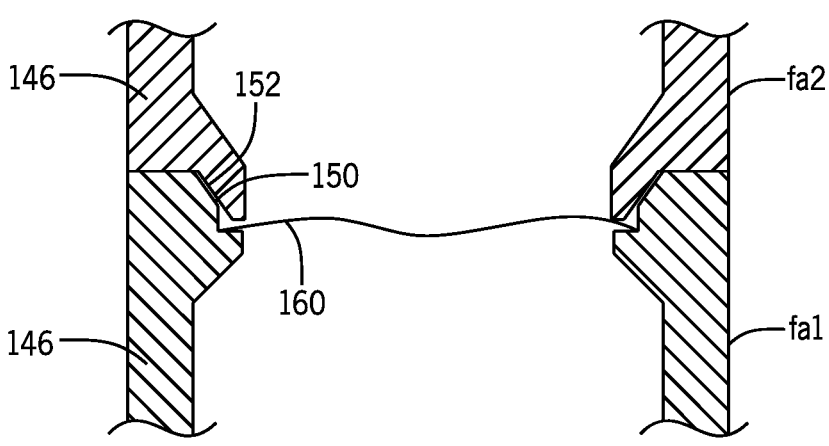
FIG. 7A is a cross-sectional view of stacked separation fittings for use with the stacked configuration of spacecraft shown in FIG. 4.
Figure 7B:
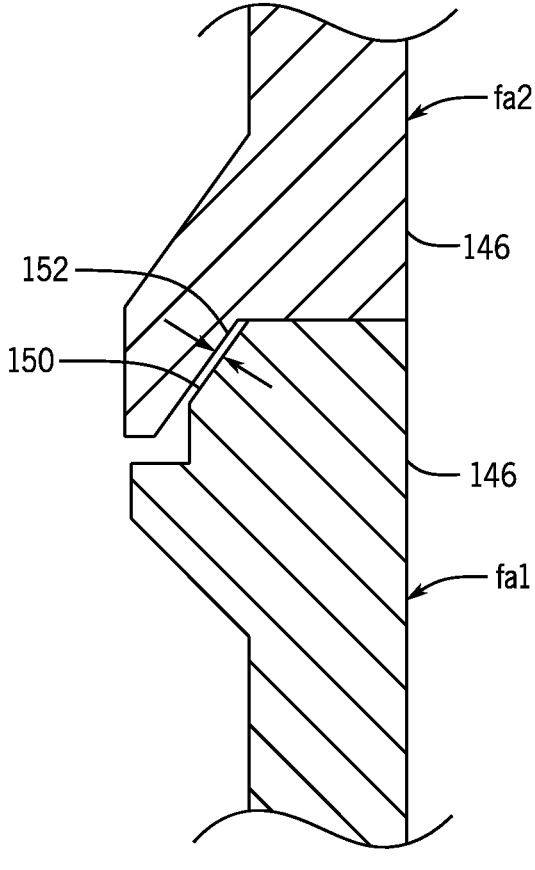
FIG. 7B is a zoomed-in view of the interface between the stacked separation fittings shown in FIG. 7A.
Figure 8:
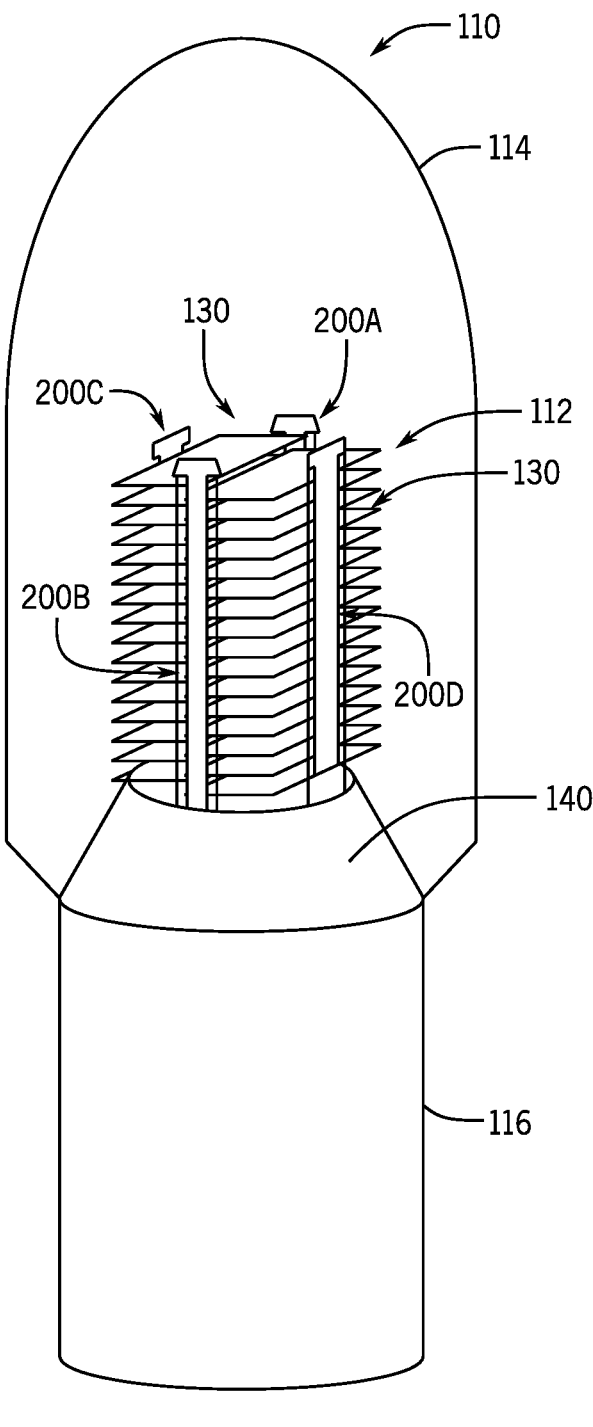
FIG. 8 is an isometric view of the exemplary spacecraft system shown in FIG. 4, wherein a hold-down and deploy system of the spacecraft system is shown in a first configuration and wherein the spacecraft system is shown disposed within a rocket.
Figure 9:
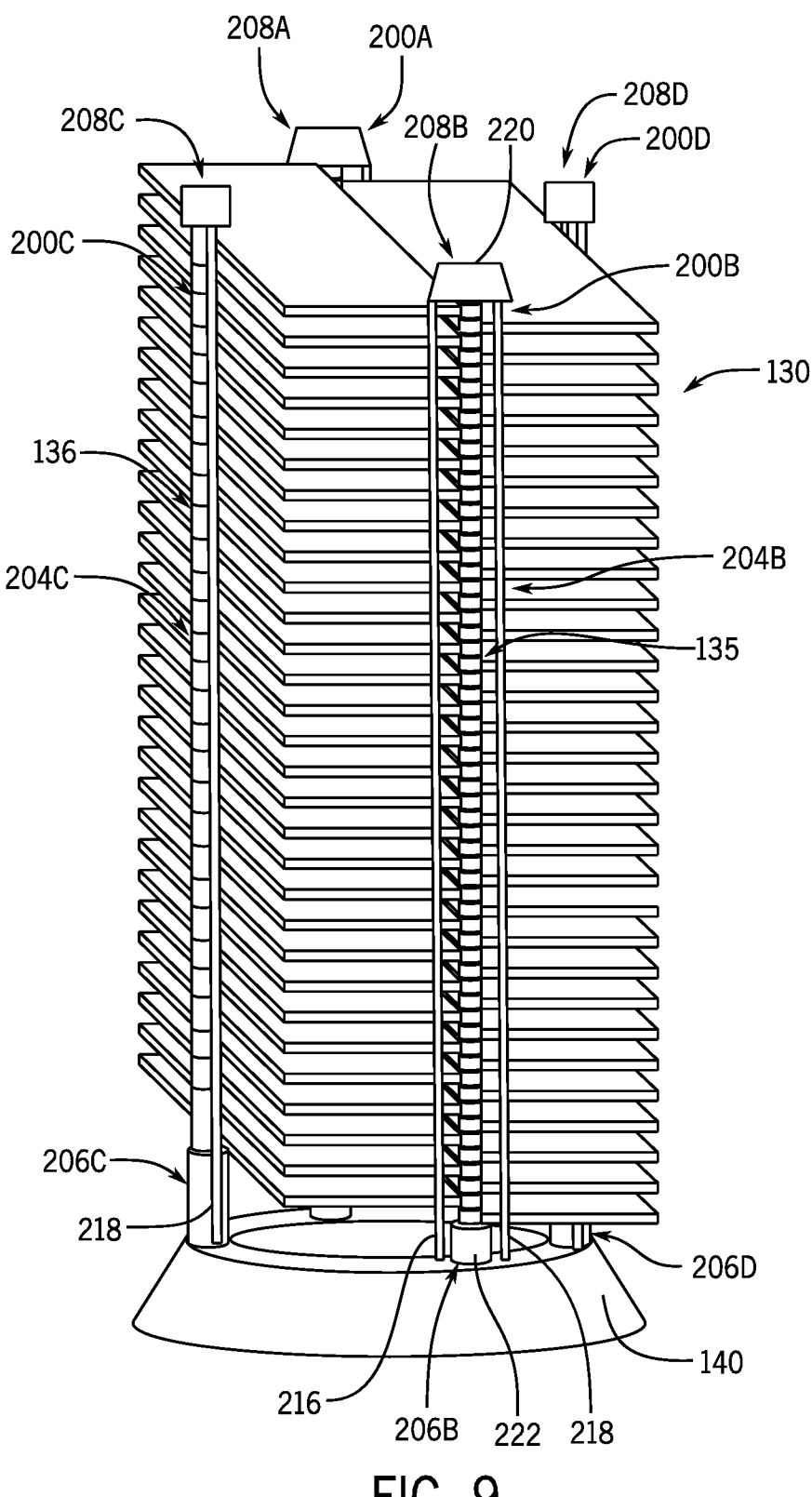
FIG. 9 is an isometric view of the exemplary spacecraft system shown in FIG. 8, wherein the hold-down and deploy system of the spacecraft system is shown in the first configuration.

Referring to FIGS. 6, 7A and 7B, the first separation fitting f1*a* includes a substantially cylindrical body 146 having a first interface 150 on a first (upper or forward) end, and a second interface 152 on a second (lower or aft) end. In the depicted embodiment, the first interface 150 is a cup shape, and the second interface 152 is a corresponding cone shape. In that regard, the cone-shaped second interface 152 of a top (or forward) satellite may be releasably received within or mated with the cup-shaped first interface 150 of a bottom (or aft) satellite, as shown in FIGS. 7A and 7B. The cup-cone interface of each separation fitting defines a joint between upper and lower satellites configured to withstand compressive loads, shear loads, and bending moment of the stack 130 during launch. In that regard, the separation fittings mate adjacent satellites such that no other significant portion of the satellite is required to withstand launch loads.

As can be seen in FIG. 7B, the cup-shaped first interface 150 has an inner diameter slightly larger than the outer diameter of the cone-shaped second interface 152 to prevent a taper lock between the interfaces. In other words, the cone-shaped second interface 152 is not press fit into the cup shaped first interface 150. Rather, the cone-shaped second interface 152 can be freely removed from the cup-shaped first interface 150 without any additional force. In that regard, the first and/or second interface 150/152 may be made with, treated with, or otherwise coated with a low-friction material to help ensure separation between the interfaces when the stack is released from the rocket. In one example, the first and/or second interface 150/152 is made from a hard-anodized material (such as aluminum) and/or coated with a dry film lubricant to define a low friction interface. In addition, a biasing device 160, such as a wave spring, may be disposed between the first and second interfaces 150 and 152 to help facilitate separation.

Spacecraft Hold-Down and Deploy Systems

As noted above with reference to FIG. 3, a structure extends along the length of the stack 130 to releasably secure the satellites S together and to releasably secure the stack 130 to a payload adaptor 140 of the launch vehicle 116.

Figure 11:
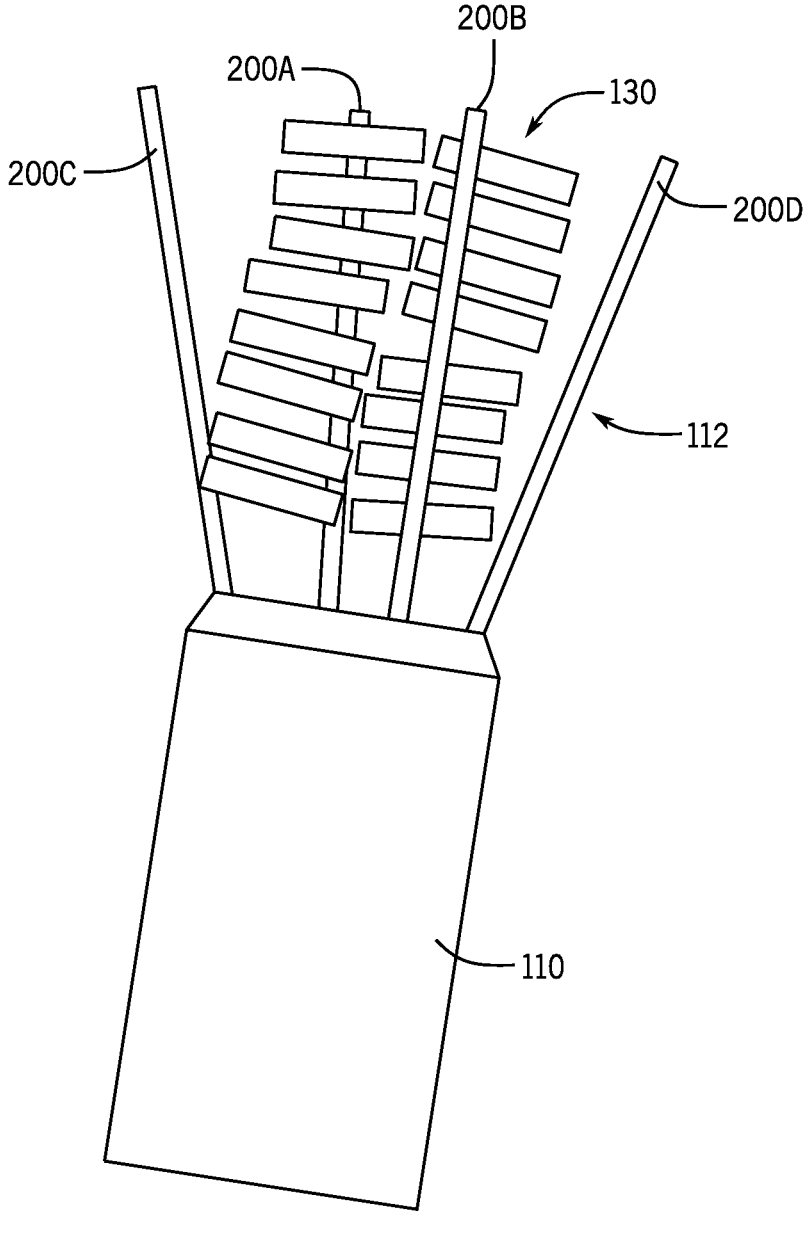
FIG. 11 is a simplified diagram showing the release of a spacecraft system including a plurality of satellites from a rocket.

Upon reaching orbit, the structure coupled to the stack 130 is released from the stack so that each of the satellites S in the stack is passively dispensed from the payload adaptor 140 of the launch vehicle 116 without the use of a dedicated dispensing system (see FIG. 11). In other words, with the stack 130 arranged as a plurality of spacecraft S in layers, and with each spacecraft S releasably mated with at least one spacecraft S in an adjacent layer, the external structure is configured to, in a first configuration, secure the layers of the stack 130 together and secure the entire stack 130 to the launch vehicle 116, and, in a second configuration, release the entire stack 130 from the launch vehicle 116 into orbit such that the layers passively separate without activation of additional dispensing mechanisms.

Figure 10:
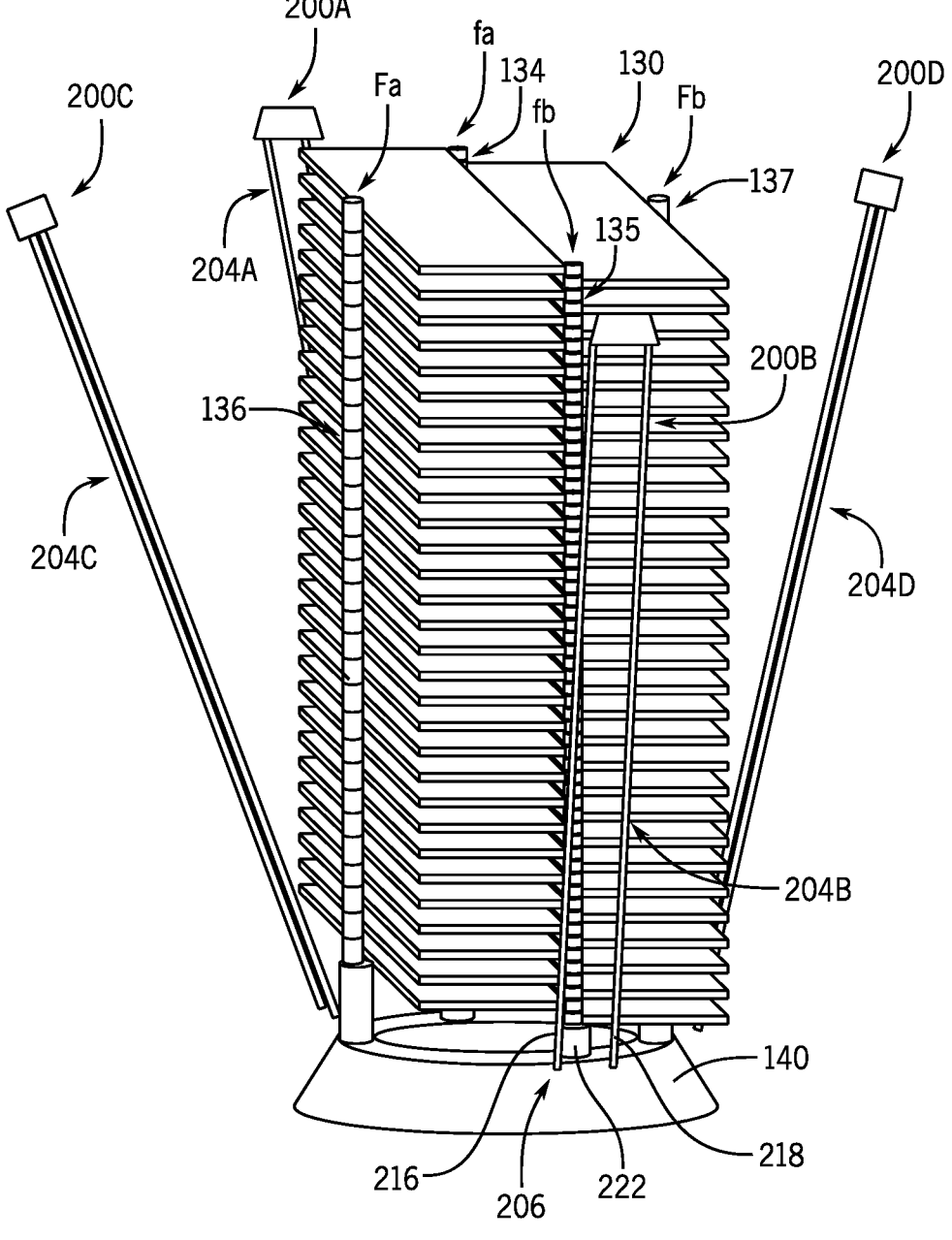
FIG. 10 is an isometric view of the exemplary spacecraft system shown in FIG. 4, wherein the hold-down and deploy system of the spacecraft system is shown in a second configuration.

Referring to FIGS. 3 and 8-11, in one embodiment, the structure is defined by first, second, third, and fourth hold-down and deploy systems 200A, 200B, 200C, and 200D extending externally along the length of the first, second, third, and fourth load columns 134, 135, 136, and 137. The first, second, third, and fourth hold-down and deploy systems 200A, 200B, 200C, and 200D are configured to apply a compressive load along the length of the corresponding first, second, third, and fourth load columns 134, 135, 136, and 137 in the first configuration (FIG. 9) and release the compressive load from the load columns in the second configuration (FIG. 10).

A general description of the first, second, third, and fourth hold-down and deploy systems 200A, 200B, 200C, and 200D will first be provided. The first, second, third, and fourth hold-down and deploy systems 200A, 200B, 200C, and 200D include first, second, third, and fourth tension rod assemblies 204A, 204B, 204C, and 204D, respectively, extending lengthwise between an aft tensioning and release mechanism 206A, 206B, 206C, and 206D and a forward tensioning and release mechanism 208A, 208B, 208C, and 208D, respectively. The first, second, third, and fourth hold-down and deploy systems 200A, 200B, 200C, and 200D are substantially identical; accordingly, the following description will generally describe a hold-down and deploy system 200 having a tension rod assembly 204 extending lengthwise between an aft tensioning and release mechanism 206 and a forward tensioning and release mechanism 208. Moreover, it should be appreciated that the fewer or more than four hold-down and deploy systems may instead be used.

In the first configuration (FIG. 9), the aft and forward tensioning and release mechanisms 206 and 208, in cooperation, stretch or otherwise create tension in the tension rod assembly 204, and in the second configuration, release the stretch/tension in the tension rod assembly 204. As a result, in the first configuration, the aft and forward tensioning and release mechanisms 206 and 208 cooperatively apply a compressive load to the corresponding load column (a "preload") 134, 135, 136, or 137. Moreover, in the second configuration (FIG. 10), the aft and forward tensioning and release mechanisms 206 and 208 cooperatively release all compressive loads from the load column and allow the stack to separate from the rocket.

The forward tensioning and release mechanism 208 includes a load head 220 that selectively engages the upper-most separation fitting in the respective load column such that it may apply a compressive load to the column when pulled down by the tension rod assembly 204. In one embodiment, the forward tensioning and release mechanism 208 is configured as a biased latching structure configured to latch the load head 220 to the top or forward end of the load column when a predetermined amount of load is imposed in the tension rod assembly 204, and configured to unlatch or otherwise disengage the load head 220 from the load column when a predetermined amount of load is released in the tension rod assembly 204.

The tension rod assembly 204 may include first and second rods 216 and 218 that extend along each side of the load column between the load head 220 of the forward tensioning and release mechanism 208 and a base 222 of the aft tensioning and release mechanism 206. In this manner, the tension rods 216 and 218 can pull down substantially equally on the load head 220 to help evenly distribute the compressive load along the load column. In that regard, a suitable balancing mechanism may be used to help distribute tension between the first and second rods 216 and 218.

The aft tensioning and release mechanism 206 allows the load head 220 to move into and out of engagement with the top of the load column and selectively impose tension in the rods 216 and 218 when the load head 220 is engaged with the top of the load column. In that regard, the aft tensioning and release mechanism 206 may be defined as a hinge structure configured to hingedly secure the aft end of the tension rod assembly 204 to the payload adaptor 140. In other words, the hold down and deploy system 200 can pivot about a hinge axis of the aft tensioning and release mechanism 206 to move between the first and second configurations.

In one embodiment, the aft tensioning and release mechanism 206 is also configured to releasably secure the rods 216 and 218 to the payload adaptor 140. In such an embodiment, the hold-down and deploy system 200 (and specifically, the forward tensioning and release mechanism 208, the rods 216/218, and at least a portion of the aft tensioning and release mechanism 206) separates from the payload adaptor 140 when pivoting away from the stack 130 (i.e., around the same time the satellites separate from the payload adaptor 140).

As noted above, the aft tensioning and release mechanism 206 is also configured to selectively apply tension in the rods 216 and 218. Any suitable configuration may be used to pull down on the rods 216 and 218 or otherwise stretch the rods 216 and 218 between the aft and forward tensioning and release mechanisms 206 and 208. In one embodiment, the aft tensioning and release mechanism 206 includes an actuator assembly configured to pull the rods 216 and 218 downwardly away from the forward tensioning and release mechanism 208 (to apply tension) and configured to allow the rods 216 and 218 to move upwardly toward the forward tensioning and release mechanism 208 (to release tension).

In operation, when the load is released in the rods 216 and 218, the forward tensioning and release mechanism 208 starts to unlatch from the top of the load column. Around the same time, the rods 216/218 start to hinge about a pivot axis of the aft tensioning and release mechanism 206 away from the stack 130. The rods 216 and 218 continue to pivot away from the stack 130 until the load head 220 disengages from the top of the load column and separates from the stack 130 (see FIG. 10). With the load head 220 disengaged from the top of the load column, the compressive load is released, and the satellites are free to separate from each other and from the payload adaptor 140 (see FIG. 11).

Components of the aft and forward tensioning and release mechanisms 206 and 208 are configured to be moved by a suitable power assembly 210 for applying and releasing tension in the rods 216 and 218. The power assembly 210 may include any suitable components for transmitting energy, such as one or more pneumatic, hydraulic, mechanical, and/or electromechanical actuators configured to power moveable mechanical parts. For instance, in one embodiment, the power assembly 210 may be configured as a pneumatic or hydraulic system configured to move a piston between at least first and second positions along the length of the tension rod assembly 204 to apply or release tension in the rods 216 and 218. In that regard, the power assembly 210 may include one or more valves (such as solenoid vales) configured to selectively place an inlet and/or outlet line of the pneumatic or hydraulic system into fluid communication with a chamber of the piston for moving the piston.

The power assembly 210 may be activated by a suitable wired or wireless controller 219. For example, the controller 219 may include suitable circuitry for selectively opening one or more valves (such as solenoid vales) for fluidly connecting an inlet and/or outlet line (of a pneumatic or hydraulic assembly) with a chamber of the piston for moving the piston. In some embodiments, the controller 219 may include suitable circuitry for activating and controlling the speed, direction, etc., of a motor to control the movement of the piston or other moveable structure.

In some embodiments, the controller 219 may also be in wired or wireless communication with one or more input devices 212 of the hold-down and deploy system 200, such as sensors, switches, etc. For instance, the tension rods 216 and 218 may include strain gauges for measuring the tension in the rods during ground operations before launch and/or during launch. In addition, and as noted above, the separation fittings may include pressure sensors or switches that are activated when adjacent satellites separate. The input devices 212 may include suitable circuitry to send one or more output signals indicative of a measurement, status, etc., and the controller 219 may include suitable circuitry for processing the one or more output signals.

The controller 219 may be any suitable electronic client device, such as a computer, personal digital assistant, cell phone, tablet computer, or any other suitable device on a network in which computer software or other digital content may be executed. The electronic client device can be controlled either directly or by a remote connection using industry standard communication protocols such as HART, Modbus, 4-20 mA, and H1, as well as other protocols.

Spacecraft

Figure 12:
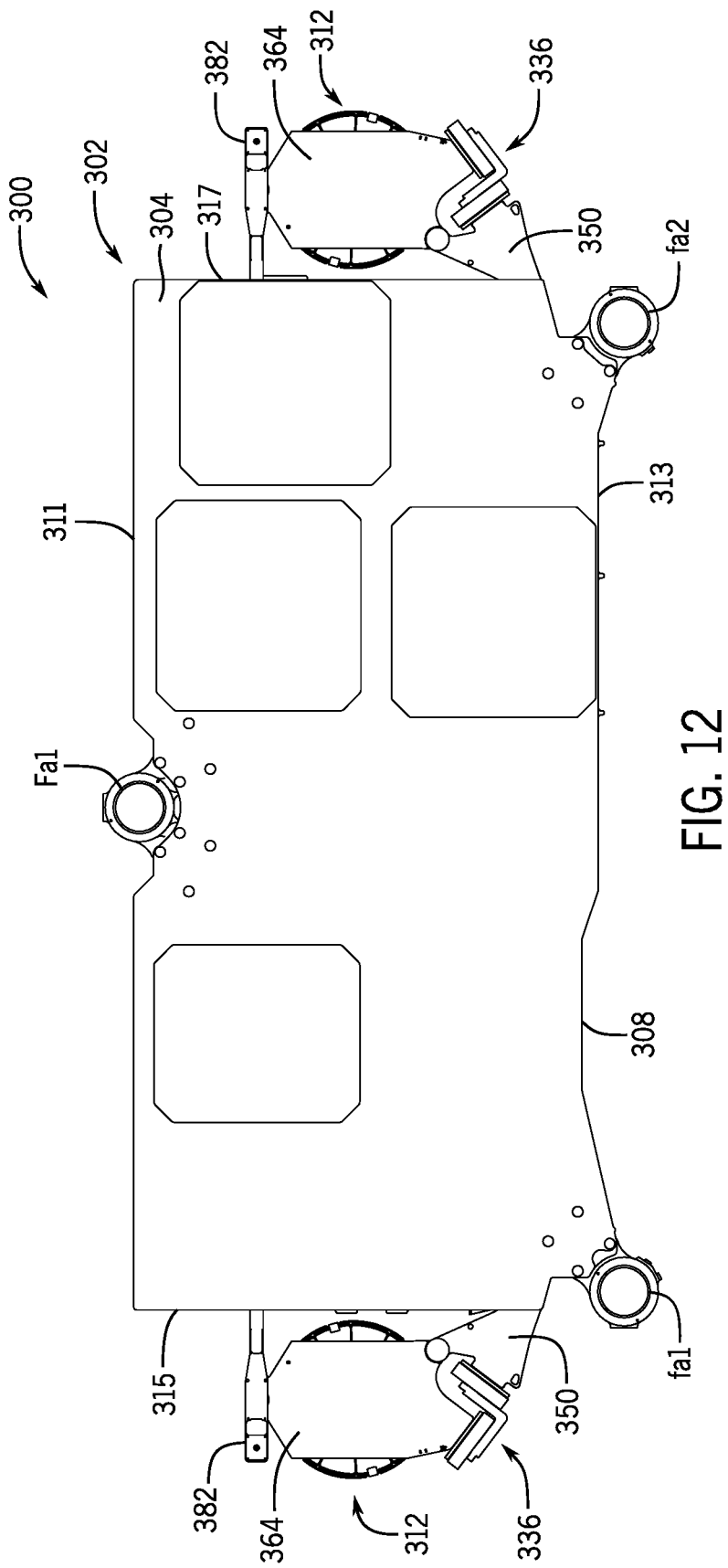
FIG. 12 is a first (earth-facing) side of a spacecraft according to one embodiment of the present disclosure.
Figure 13:
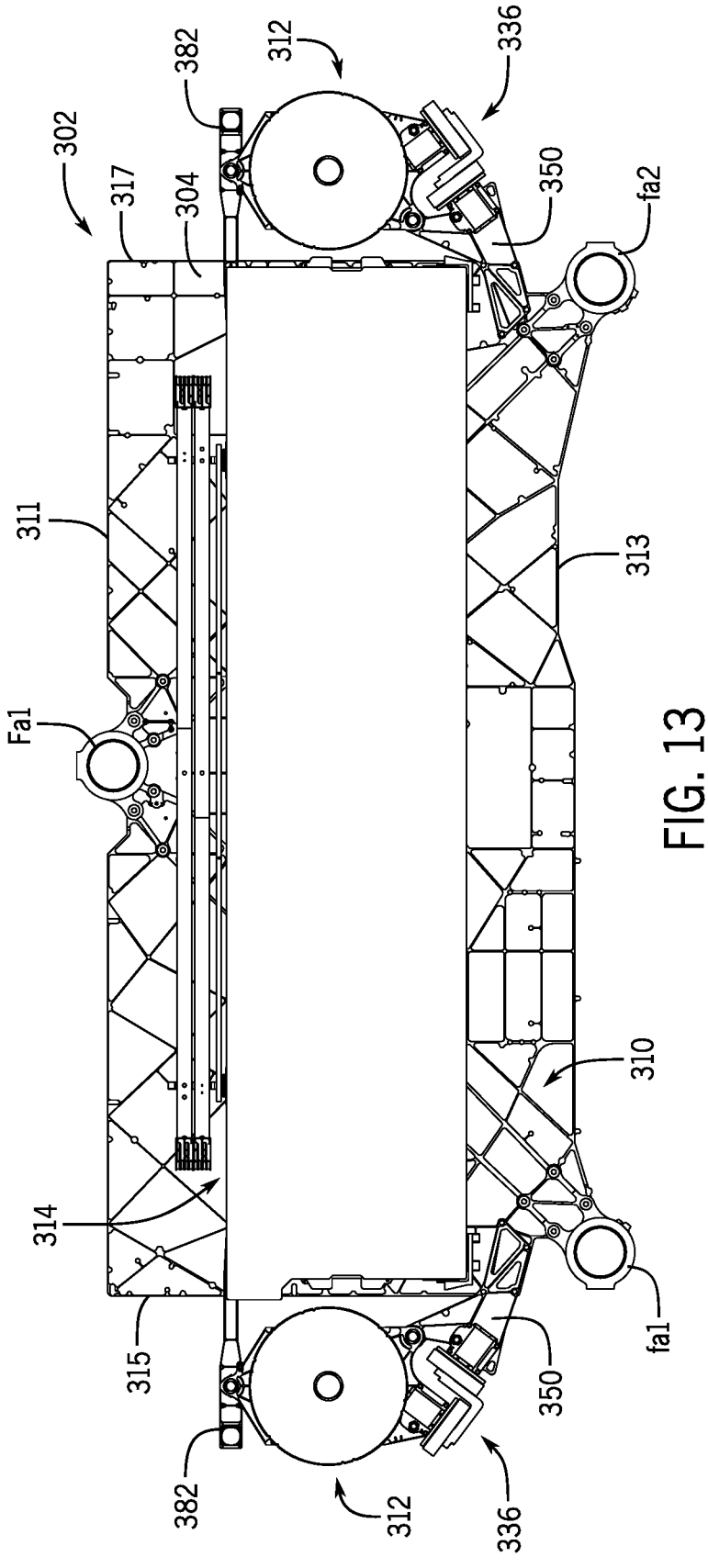
FIG. 13 is a second (outer space-facing) side of the spacecraft of FIG. 12.
Figure 14:
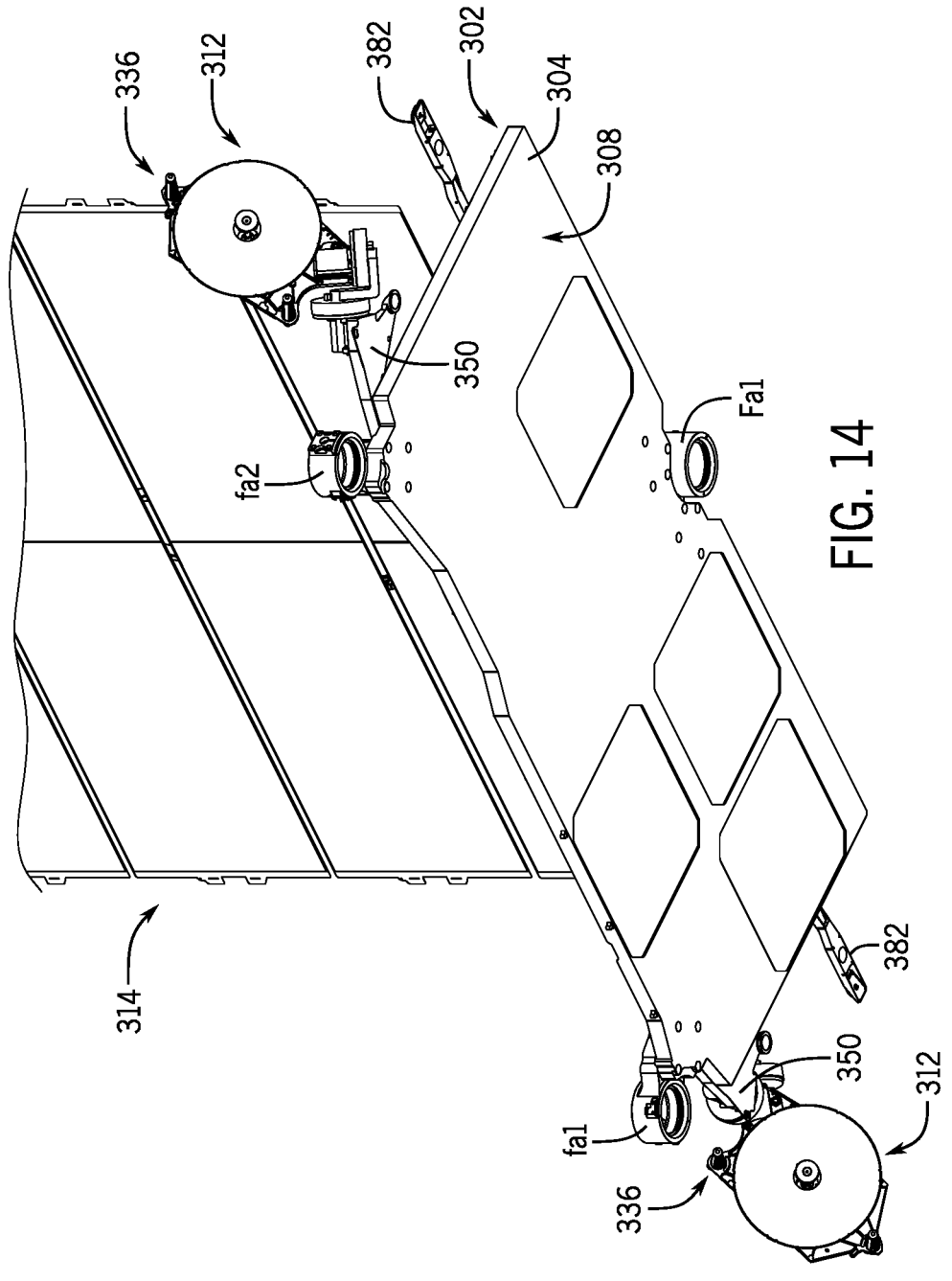
FIG. 14 is an isometric view of the spacecraft of FIG. 12 shown deployed in outer space with the antenna system tracking a gateway antenna on earth.
Figure 15:
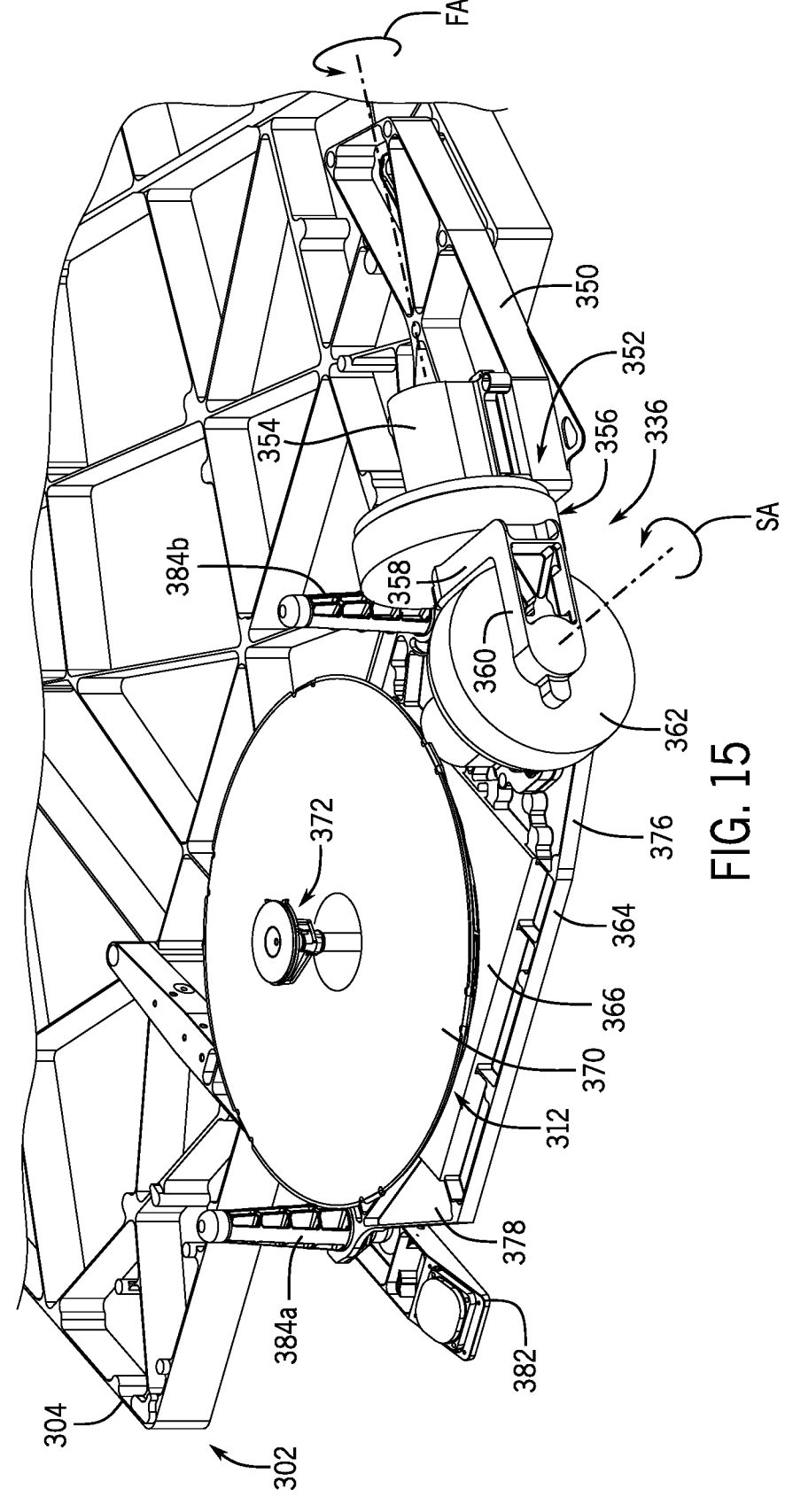
FIG. 15 is a close-up view of an antenna system of FIG. 14.

Referring to FIGS. 12-14, a spacecraft 300 in accordance with embodiments of the present disclosure will now be described. Generally, the spacecraft 300 includes a chassis 302 having a flexible solar array 314 moveable from a collapsed or folded configuration against the chassis 302 (FIG. 13), and an extended configuration deployed from the chassis 302 (FIG. 14).

The chassis 302 includes a chassis body 304 that is designed and configured for carrying various components of the spacecraft 300. In addition, the chassis 302 may generally act as a thermal radiating body, or a heat sink, to radiate and dissipate heat generated by some of the various components of the spacecraft 300.

The chassis body 304 has any suitable shape and configuration for carrying the desired components during launch and into outer space. In the depicted exemplary embodiment, the chassis body 304 is generally an elongated, flattened solid plate or panel on which various components may be mounted or otherwise integrated. More particularly, the chassis body 304 has an overall substantially flattened rectangular shape defined by first and second opposing sides 308 and 310 bounded by first and second opposing generally elongated edges 311 and 313 and first and second opposing shortened edges 315 and 317. The first side 308 is an Earth-facing side (FIG. 12), and the second side 310 is an outer-space-facing side (FIG. 13), which carries the solar array 314 for harnessing solar energy from the sun.

The components of the spacecraft 300 carried by the chassis 302 may include payload components (such as phased array transmit and receive panels, a satellite network computer, and modem boards), power storage and distribution components (such as a battery and a flight computer), and low heat components (such as a thruster, thruster propellant containers, torque rods, solar array steering actuators, reaction wheels, antenna systems, star trackers, magnetometers, tracking and telemetry radios, cameras, and GPS antennas). Depending on the requirements of the component (such as heat generation, field-of-view requirements, wiring connections, etc.), the components may be strategically located on the chassis body 304. For instance, low heat components may be cantilevered from the chassis 302 since heat dissipation to the chassis body 304 is not required.

In the illustrated embodiment, the spacecraft 300 includes two parabolic antennas 312 cantilevered from the chassis 302. However, any number of parabolic antennas 312 is within the scope of the present disclosure. As shown in FIG. 12-14, each parabolic antenna 312 is part of a parabolic antenna system 336 that is coupled to the chassis 302 and that controls and steers the parabolic antenna 312 so it can track the gateway terminal.

Parabolic Antenna and Restraint System

Referring to FIGS. 12-19, this section describes an exemplary embodiment of a parabolic antenna system 336 in detail. In general, the parabolic antenna system 336 is configured to secure the parabolic antenna 312 in a cantilevered position relative to the chassis 302. Further, the parabolic antenna system 336 is configured to move the parabolic antenna 312 between a non-deployed or launch position (see FIGS. 12 and 13) and a deployed position (see FIG. 14) relative to the chassis 302. In addition, the parabolic antenna system 336 passively restrains portions of the antenna 312 (i.e., substantially prevents movement of the antenna 312) when the satellites are in a stacked launch configuration to minimize any damage to the antenna components (see FIGS. 18 and 19).

The parabolic antenna system 336 may include an antenna electronics assembly 366 coupled to a panel 364 beneath the antenna 312. The antenna 312 includes a parabolic reflector 370 mounted to the panel 364 (such as through the antenna electronics assembly 366), and a feed antenna/orthomode transducer 372 centered within the reflector 370. It should be appreciated that other components may be used instead or in lieu of the components set forth herein. Moreover, the parabolic antenna system 336 may be a Ka band antenna system; however, the description is equally applicable to other types of antenna systems.

Exemplary aspects of the parabolic antenna system 336 for securing the parabolic antenna 312 in a cantilevered position relative to the chassis 302 and for moving the antenna 312 between a non-deployed (or launch) position and a deployed position will first be described with reference to FIGS. 12-17. To begin, FIGS. 12 and 13 show the spacecraft 300 in a non-deployed or launch state with the solar array 314 collapsed or folded against the chassis 302. With the solar array 314 collapsed or folded against the chassis 302, the spacecraft may be arranged in a stacked configuration for launch. To accommodate the stacked spacecraft configuration, the parabolic antennas 312 of the antenna system 336 are also configured in a non-deployed or launch state. Turning to FIG. 14, the spacecraft 300 is shown in a deployed state with the solar array 314 expanded, and with the parabolic antennas 312 of the antenna system 336 in a deployed configuration, for example, in order to best track the gateway ground antennas, as described with reference to FIG. 1.

As seen in FIGS. 12-17, the spacecraft 300 includes two parabolic antenna systems 336, each cantilevered off the shortened edges 315 and 317 of the chassis body 304 generally at opposing corners of the chassis 302, proximal or adjacent to the demi-stepped separation fittings f1a and f1b. However, the parabolic antenna systems 336 may instead be located at other locations on the chassis 302. Moreover, the spacecraft 300 may include fewer than two or more than two parabolic antenna systems 336. Finally, since both of the parabolic antenna systems 336 include the same components, only one will be described herein.

In a first aspect, the parabolic antenna system 336 mounts the antenna 312 in a cantilevered position relative to the chassis 302 and in a manner that allows for movement of the antenna 312 between the deployed and non-deployed (or launch) positions. In the depicted embodiment, the parabolic antenna system 336 includes a first support arm 350 extending from the edge of the chassis 302 a suitable distance for locating the antenna 312 in a cantilevered position relative to the chassis 302. The first support arm 350 is fastened to the chassis body 304 by, for example, threaded members (e.g., screws, bolts) or other types of fasteners. While the first support arm 350 is described as a separate component from the chassis body 304, it should be appreciated that the first support arm 350 may be an integral part of the chassis body 304 without departing from the scope of the present disclosure.

A two-axis gimbal 352 is mounted to a cantilevered portion of the first support arm 350 and is configured to move the antenna 312 (and any other relevant components) relative to the chassis 302 of the spacecraft 300. For instance, the two-axis gimbal 352 can be activated to move the antenna 312 into a deployed position and between multiple degrees of freedom relative to chassis 302 in order to track the gateway ground antennas.

In one embodiment, the two-axis gimbal 352 includes a first drive motor 354 that is mounted to a cantilevered portion of the first support arm 350 in a suitable manner, such as with a bracket mounting assembly (not labeled or described in detail). The first drive motor 354 rotates an output drive shaft (not shown) about a first axis FA. The output drive shaft of the first drive motor 354 is transversely coupled to an L-shaped or right angle bracket 356 at a first portion 358 of the bracket such that the right angle bracket 356 moves with the output drive shaft.

A second portion 360 of the right angle bracket 356, transverse to the first portion 358, is coupled to an output drive shaft of a second drive motor 362, wherein the output drive shafts of the first and second drive motors 354 and 362 are oriented orthogonally to each other. In that regard, the output drive shaft of the second drive motor 362 rotates about a second axis SA, which is substantially perpendicular to the first axis FA.

The second drive motor 362 is mounted to the panel 364 on which the parabolic antenna 312, among other antenna system components, are coupled. With the first drive motor 354 mounted to the first support arm 350, the second drive motor 362 mounted to the panel 364, and the first and second drive motors 354, 362 operably coupled to each other via the right angle bracket 356, actuation of the first and second drive motors 354, 362 will cause the panel 364 (as well as the attached components, including the antenna 312) to move relative to the chassis body 304 along two degrees of freedom. In particular, the panel 364 and attached components can rotate about the first and second axes FA, SA in order to move into a deployed position and to track the gateway ground antennas.

In one embodiment, the drive motors 354 and 362 of the two-axis gimbal 352 may be direct-drive motors with absolute encoders for controlling position and speed. The drive motors 354 and 362 may be activated and controlled through the controller 219. In that regard, the drive motors 354 and 362 can send encoder output to the controller 219 for processing, reporting, etc. As can be appreciated by one of ordinary skill, the speed, direction, rotary distance, etc., traveled by the antenna 312 and other components can be tracked by the encoder of the drive motors 354 and 362. Such data can be processed by the controller 219 to assess and automatically adjust the position of the antenna 312 relative to chassis 302 in order to track the gateway ground antennas.

Figure 16:
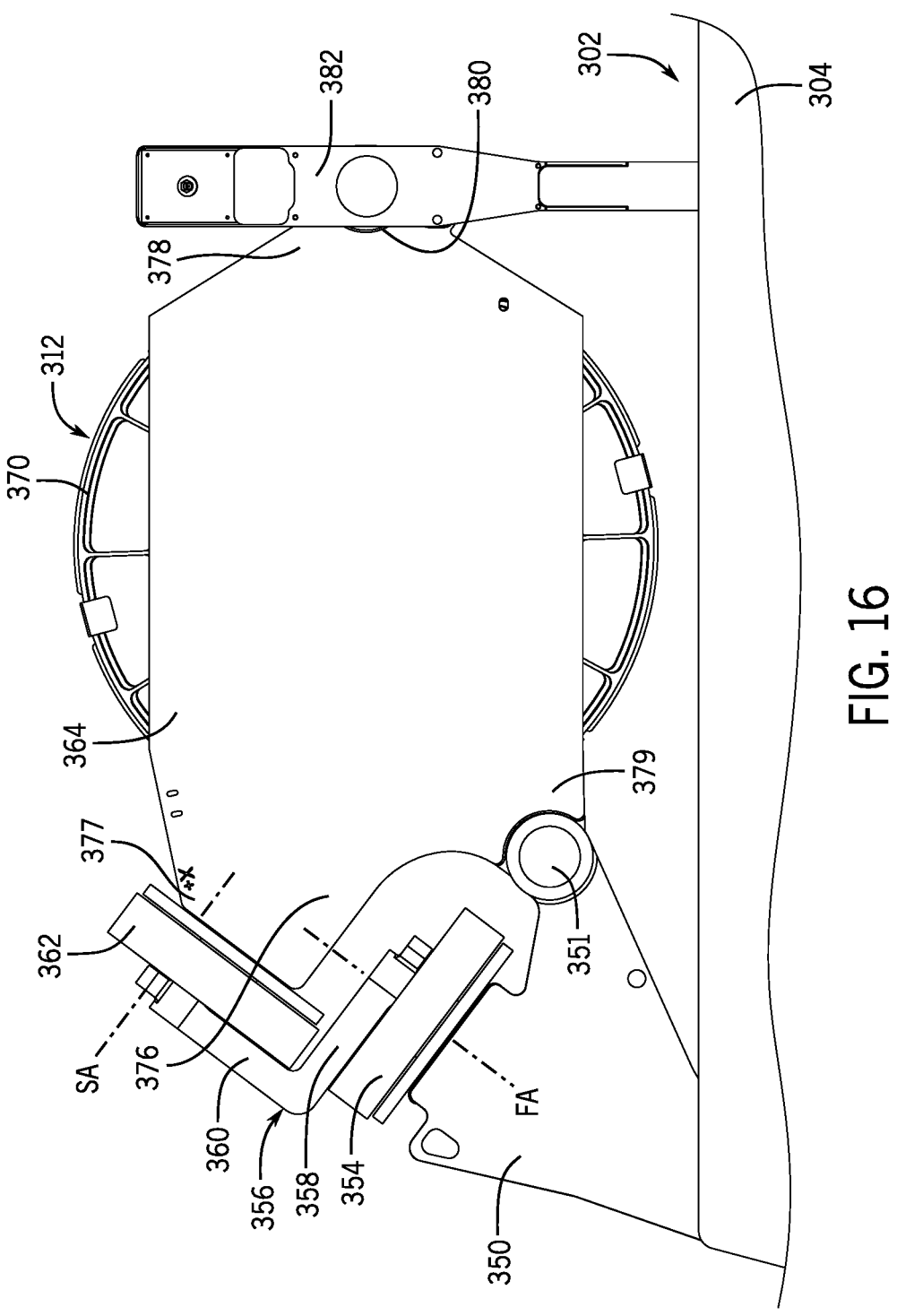
FIG. 16 is a first side of the antenna system of FIG. 14.
Figure 17:
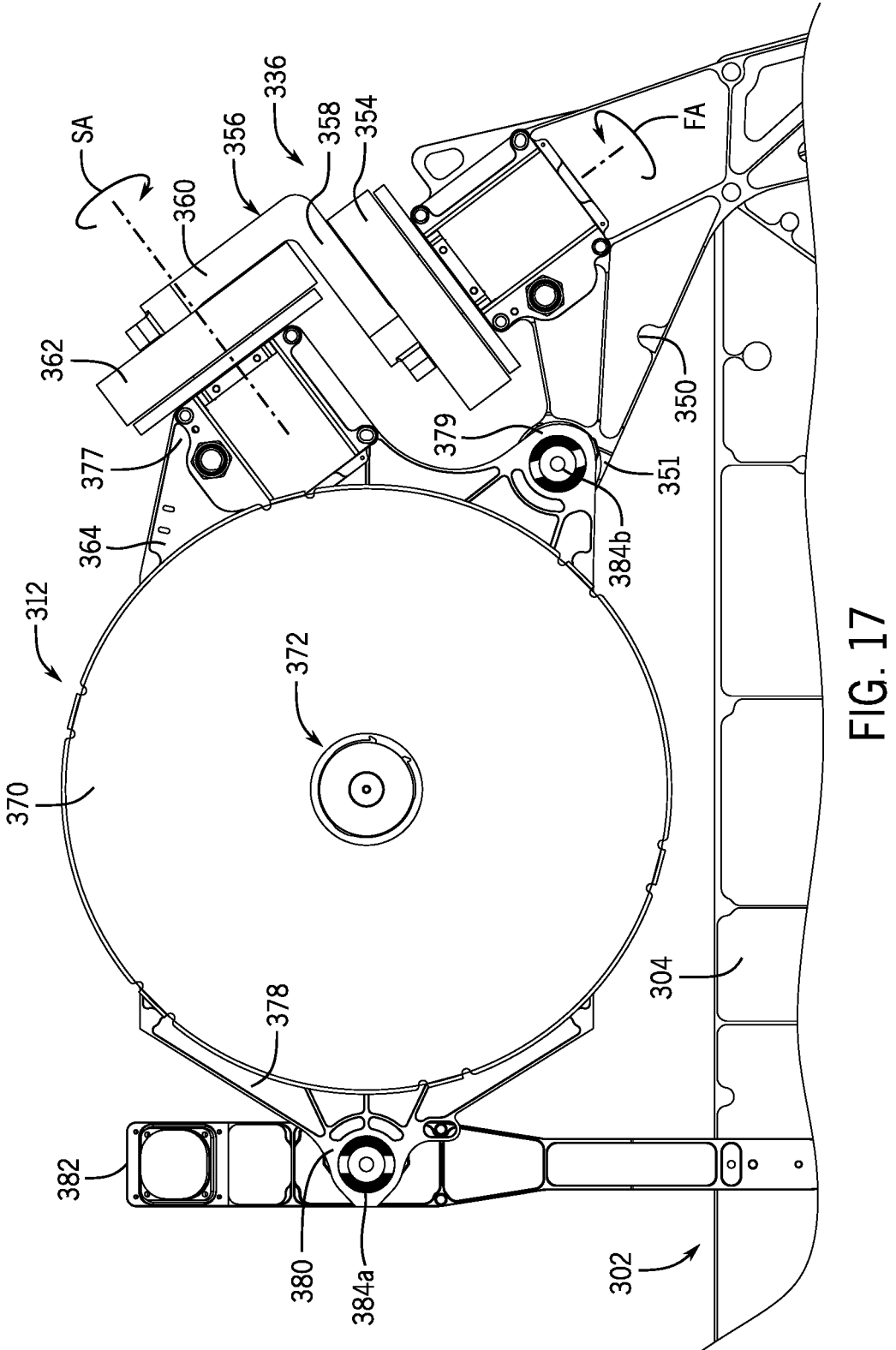
FIG. 17 is a second side of the antenna system of FIG. 14.

FIGS. 16 and 17 depict close-up views of the first and second sides 308 and 310 of the spacecraft 300 showing the corresponding first and second sides, respectively, of the antenna system 336. In the close-up views shown in FIGS. 16 and 17, the panel 364 can be seen in greater detail. As can be seen, the panel 364 is generally of a rectangular shape with a mounting end 376 generally opposite a free end 378, and with the antenna 312 positioned generally centrally on the second side of the panel 364 when it is in the non-deployed position.

At the mounting end 376, the panel 364 is mounted to the second drive motor 362 at a first corner portion 377. A second corner portion 379 of the panel 364 at the mounting end 376 opposite the first corner portion 377 is vertically aligned with a support section 351 extending from the first support arm 350 when the antenna system 336 is in a non-deployed position. More specifically, with the spacecraft 300 in a stacked configuration and with the antenna system 336 in the non-deployed position, the support section 351 is positioned above the second corner portion 379 of the panel 364. A support member, such as a suitable cushioning member 353 (see FIG. 18), may extend from the support section 351 to engage and help prevent lateral and vertical movement of the panel 364 at the second corner portion 379.

At the free end 378, the panel 364 softly tapers to a point 380 beyond the parabolic reflector 370 of the antenna 312. In the non-deployed position, the point 380 of the panel 364 is vertically aligned with or otherwise supported by a second support arm 382 that is cantilevered from the chassis body 304. More specifically, with the spacecraft 300 in a stacked configuration and with the antenna system 336 in the non-deployed position, the second support arm 382 is positioned above the panel 364. A support member, such as a suitable cushioning member 383 (see FIG. 19), may extend from the second support arm 382 to engage and help prevent lateral and vertical movement of the panel 364 at the point 380.

Based on the foregoing, it can be appreciated that the antenna system 336 is mechanically supported on its own spacecraft by at least three points in the non-deployed or launch position: (1) by the connection of the second drive motor 362 to the first support arm 350; (2) by the interface of the point 380 of the panel 364 and the second support arm 382; and (3) by the interface of the second corner portion 379 of the panel 364 and the support section 351 of the first support arm 350. It should be appreciated that fewer than three or more than three mechanical support points may instead be used. Moreover, any suitable contact or mating engagement between the panel 364 and the support section 351/second support arm 382 or other portions of the chassis 302 may be used to help position and/or help suitably restrain the panel 364 in the non-deployed position (other than cushioning members 353 and 383). Thus, the use of the term "contact", "abutting,", "cushion", "interface" or the like used throughout should not be seen as limiting.

The three-point support structure of the antenna's own spacecraft defines a first part of a passive restraint system for the antenna system 336. In general, the passive restraint system helps prevent excessive movement of the antenna system 336 during launch when the antenna system 336 is in the non-deployed or launch position and when the antenna system 336 is at least initially in a launch or powered-off state.

The passive restraint system may additionally include support members that extend between adjacent spacecraft in a stack to help support and/or help suitably restrain the antenna system 336 in the non-deployed position. As best seen in FIGS. 15, 17, 18, and 19, the antenna system 336 includes a first support member or ascent snubber 384*a* extending from the panel 364 at the point 380, and a second support member or ascent snubber 384*b* extending from the panel 364 at the mounting end 376 near a corner opposite the second drive motor 362.

The first and second ascent snubbers 384*a* and 384*b* each include a rigid body that is generally conical in shape that terminates in a flexible, deformable, or elastomeric distal tip comprised of, for instance, rubber or silicone (not separately labeled). The first and second ascent snubbers 384*a* and 384*b* extend downward from the second side of the panel 364 a sufficient distance to engage their distal, elastomeric tip with a corresponding portion of an antenna system 336 of an adjacent spacecraft.

In that regard, the first and second ascent snubbers 384 help further prevent excessive movement of the antenna system 336 during launch when the antenna system 336 is in the non-deployed or launch, powered-off position. Conventional systems may employ active (powered) mechanisms and/or other mechanical mechanisms (such as launch locks, bolt cutters, pin pullers, etc.) to secure or lock components between adjacent spacecraft during launch. However, such powered and/or other mechanical mechanisms may ultimately have the undesirable effect of increasing weight, generating heat, and increasing power consumption of the spacecraft. Moreover, active separation mechanisms (such as pyrotechnics or control systems) are typically needed to separate the restraints between adjacent spacecraft, further adding to weight and cost of the spacecraft. The ascent snubbers 384, on the other hand, suitably restrain the antenna systems 336 between adjacent spacecraft during launch of the rocket and during deployment of the spacecraft from the rocket without the use of power or active separation mechanisms.

It should be appreciated that the terms "hold," "secure", "restrain," "restraint" or the like shall be understood to mean preventing an adequate amount of movement (in the lateral directions, vertical directions, etc.) such that the antenna system 336 is not damaged during launch.

With the foregoing general description of the three-point support structure and ascent snubbers in mind, the overall operation of the passive restraint system for substantially restraining the parabolic antenna system 336 during launch of the rocket and deployment of the satellites from the rocket will now be described. As described in the previous sections, spacecraft systems may launch satellites in a stacked configuration from a payload adaptor of a launch vehicle. The spacecraft system may include a structure extending along the length of the stack of satellites to releasably secure the satellites together and to releasably secure the stack of satellites to the payload adaptor of the launch vehicle. Upon reaching orbit, the structure coupled to the stack may be released from the stack so that each of the satellites in the stack is passively dispensed from the payload fairing of the launch vehicle without the use of a dedicated dispensing system.

During launch of the spacecraft system, the satellites are typically at least initially unpowered. In such an unpowered initial launch state, there is no power to activate the drive motors 354 and 362. Accordingly, the first and second drive motors 354 and 362 of the two-axis gimbal 352 may not have sufficient resistance to overcome the jostling associated with the launch. Without power, the motors 354, 362 cannot drive the output shafts to hold the panel 364 and attached components steady (e.g., to substantially maintain the antenna system 336 in a non-deployed position). That is, the drive shafts of the first and second drive motors 354 and 362 are rotationally free. In that regard, the panel 364, as well as the antenna 312 and other components attached to the panel 364, would be free to rotate about the first and second axes FA and SA of the first and second drive motors 354 and 362.

As noted above, conventional systems may employ active (powered) mechanisms and/or other mechanical mechanisms (such as launch locks, bolt cutters, pin pullers, etc.) to secure or lock components of the spacecraft in place during launch. However, such powered and/or other mechanical mechanisms may ultimately have the undesirable effect of increasing weight, generating heat, and increasing power consumption of the spacecraft.

Figure 18:
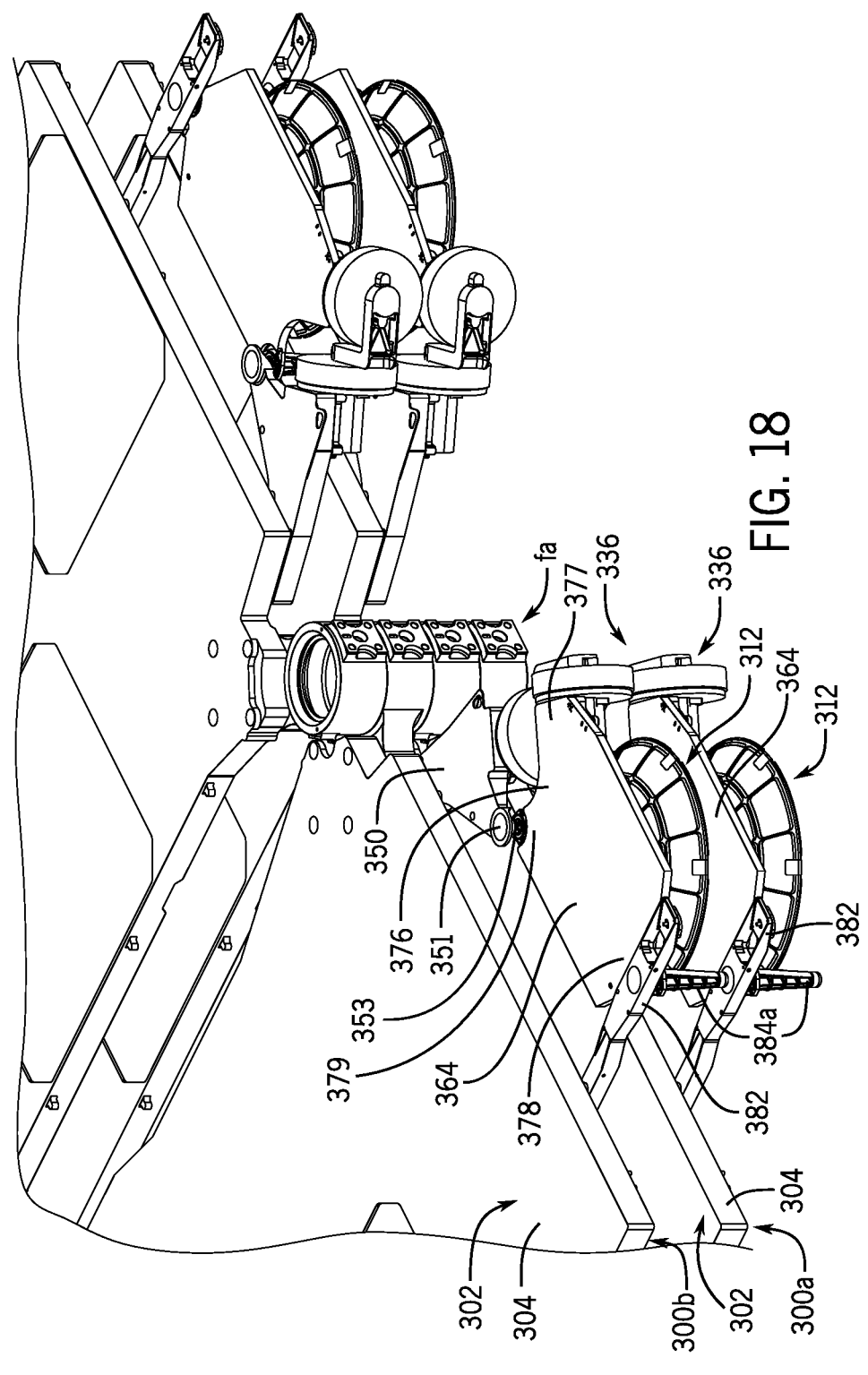
FIG. 18 is an isometric view showing spacecraft in a stacked configuration, with each of the spacecraft having an antenna system as shown in FIG. 14.
Figure 19:
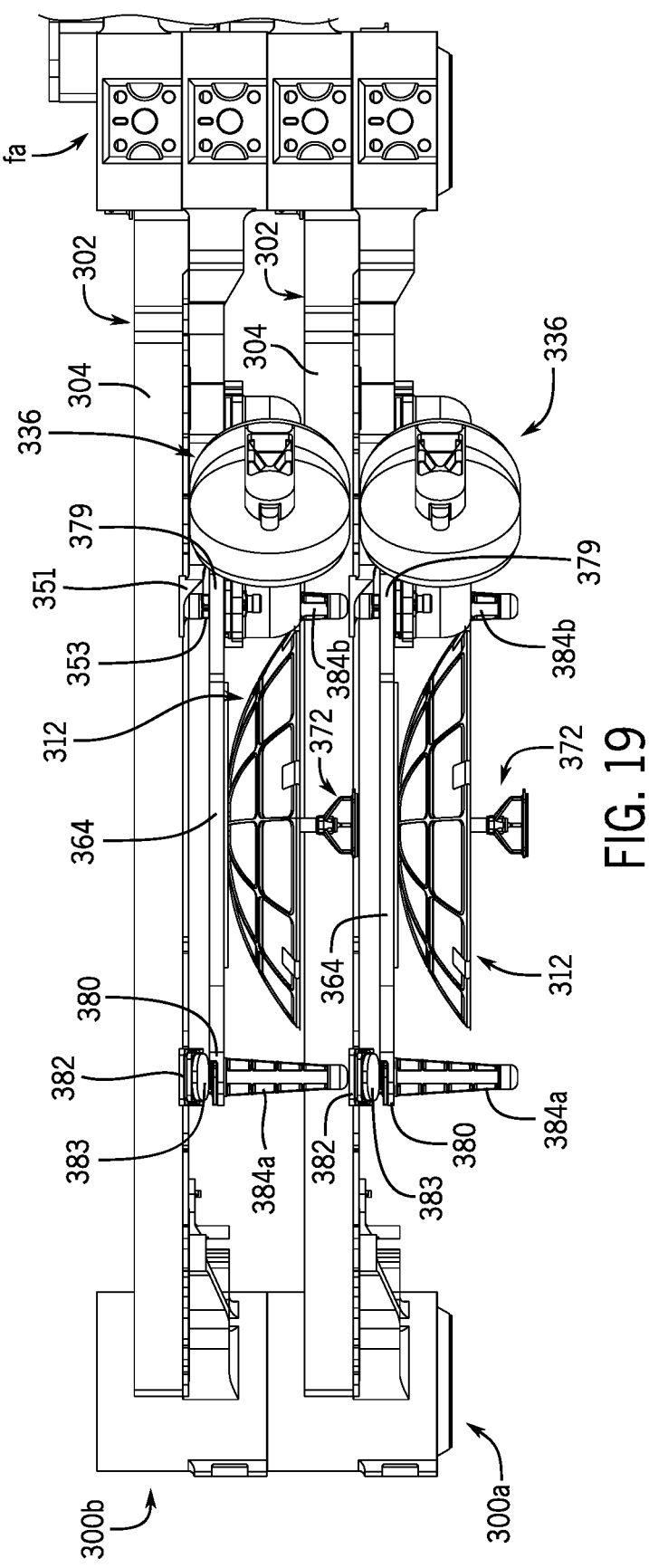
FIG. 19 is a side view of first and second stacked spacecraft of FIG. 18.

The passive restraint system is configured to passively restrain each antenna system 336 between adjacently positioned satellites in a stacked configuration and in an unpowered launch state. To illustrate the beneficial effects of the passive restraint system, reference is made to FIGS. 18 and 19, which depicts first and second satellites 300a and 300b in a stacked arrangement for launch. More specifically, as seen in FIGS. 18 and 19, the first side (earth-facing side) 308 of satellite 300a faces the second side (outer space-facing side) 310 of satellite 300b, which is stacked on top of satellite 300a. The depiction in FIGS. 18 and 19 is exemplary of two satellites 300a, 300b in the stack, but the passive restraint system is also applicable to any suitably stacked arrangement of satellites, such as the arrangement shown in FIG. 4.

As described above, the non-deployed antenna system 336 of each satellite 300a and 300b is mechanically supported by its own satellite through at least three points of support. Specifically regarding satellite 300b, the antenna system 336 is supported at a first point by the connection of the second drive motor 362 to the first support arm 350 extending from the chassis 302. The antenna system 336 is supported at a second point by the interface of the point 380 of the panel 364 and the second support arm 382 extending from the chassis 302. As noted above, a cushioning member 383 is disposed between the second support arm 382 and the point 380 to minimize lateral and vertical movement between the second support arm 382 and the point 380. Finally, the antenna system 336 is supported at a third point by the interface of the second corner portion 379 of the panel 364 and the support section 351 of the first support arm 350 extending from the chassis 302. A cushioning member 353 extends from the support section 351 to minimize lateral and vertical movement of the second corner portion 379 relative to the first support arm 350.

The non-deployed antenna system 336 of satellite 300b is further mechanically supported by the first and second ascent snubbers 384a and 384b extending from satellite 300b to adjacently positioned satellite 300a. More specifically, regarding the antenna system 336 of satellite 300b, the first ascent snubber 284a from point 380 of panel 364 extends to the second support arm 382 of satellite 300a. Moreover, the second ascent snubber 284b of satellite 300b extends from the second corner portion 379 of panel 364 to the support section 351 of the first support arm 350 of satellite 300a.

When in a stacked configuration, the panels 364 of the antenna systems 336 of satellites 300a and 300b are substantially vertically aligned. More particularly, the point 380 and second corner portion 379 of the panel 364 of satellite 300b are substantially aligned with the point 380 and second corner portion 379 of the panel 364 of satellite 300a. In this manner, the first and second ascent snubbers 384a and 384b are aligned with cushioning members 383 and 353, respectively at two of the points of the three-point support described above. In effect, the antenna system 336 of satellite 300b is sandwiched between portions of the adjacently positioned satellites 300a and 300b in a non-deployed configuration.

More particularly, the point 380 of the panel 364 of satellite 300b is supported on a top or first side by the second support arm 382 of satellite 300b through cushioning member 383. The point 380 of the panel 364 of satellite 300b is also supported on a bottom or second side by the second support arm 382 of satellite 300a through the first ascent snubber 384a. In that regard, the first ascent snubber 384a extends between the satellites 300b and 300a to provide a cushioned and/or frictioned interface between the satellites at the point 380.

Similarly, the second corner portion 379 of the panel 364 of satellite 300b is supported on a top or first side by the support section 351 of the first support arm 350 of satellite 300b through cushioning member 353. The second corner portion 379 of the panel 364 of satellite 300b is also supported on a bottom or second side by the support section 351 of satellite 300a through the second ascent snubber 384b. In that regard, the second ascent snubber 384b extends between the satellites 300b and 300a to provide a cushioned and/or frictioned interface between the satellites at the support section 351.

The cushioning members 383/353 and the cushioned tips of the ascent snubbers 384a and 384b, when sandwiched between the satellites 300a and 300b, help prevent unwanted vertical and/or lateral movement of the panels 364 in the stacked configuration. With the antenna systems 336 sandwiched in the stack of satellites in this manner, the antenna systems 336 are substantially restrained from errant movement in a way that does not require active (powered) systems to hold down the componentry during and after launch. For instance, the cushioned sandwiched configuration of passive restraint system minimizes the jostling of the panel 364 about the axes of the drive motors during launch.

Moreover, the cushioning members 383/353 and the cushioned tips of the ascent snubbers 384a and 384b simply separate from the engaged component when the satellites separate from the stack, i.e., without requiring any active separation mechanisms. In other words, the passive restraint system defined between stacked, adjacent satellites simply releases passively when the satellites deploy, i.e., they do not need to be actively disengaged to support the deployment of the spacecraft from the stack.

It should be appreciated that the passive restraint system described and illustrated herein may also be used after the antenna systems 336 have been activated or powered on. For instance, the satellites may be powered on before they are released from the stack. In such a situation, the passive restraint system described herein would be redundant or supplementary to the restraint provided by the resistance of the powered-on drive motors 354 and 362. Thus, it should be appreciated that the "launch state" may include an initial powered-off condition, where passive restraint of the antenna systems 336 is needed, as well as a powered-on condition, where redundant restraint of the antenna systems 336 may be beneficial.

It should further be appreciated that aspects of the passive restraint system may be modified for different antenna configurations. For instance, fewer than three or more than three mechanical support points may instead be used. Moreover, the cushioning members and/or ascent snubbers may be of a different size, shape, or configuration to support a different cantilevered antenna arrangement. Moreover, fewer or more cushioning members and/or ascent snubbers may be used to increase or decrease the restraint needed. Accordingly, the descriptions and illustrations provided herein should not be seen as limiting.

An exemplary method of launching and releasing spacecraft from a rocket will now be described. The method may include orienting a parabolic antenna of a first spacecraft in a non-deployed launch position, as shown in FIG. 13. With the antenna in a non-deployed position, the first spacecraft may be positioned next to a second spacecraft to define a stacked spacecraft configuration in the rocket, as shown in FIGS. 18 and 19. The antenna is sandwiched between the adjacent first and second spacecraft through a passive restraint system, such as the system described herein.

After launching the rocket, the method includes substantially preventing movement of the first parabolic antenna in a launch state, such as with the passive restraint system described herein. The method further includes deploying the first and second spacecraft from the stack into space to allow passive release of the restraint system and therefore movement of the first parabolic antenna into a deployed position, as shown in FIG. 14.

The foregoing steps may be performed in a powered-off or launch state, where passive restraint of the antenna systems is needed, as well as a powered-on or deployed state, where redundant restraint of the antenna systems may be beneficial.

While illustrative embodiments have been illustrated and described, it will be appreciated that various changes can be made therein without departing from the spirit and scope of the disclosure.

Listing of Exemplary Innovations

A spacecraft system includes a first spacecraft having a chassis and a first antenna moveably mounted to the chassis, a second spacecraft having a chassis, wherein the second spacecraft is adjacent the first spacecraft during launch to define a stacked configuration, and a passive restraint system defined between the first and second spacecraft that is configured to substantially prevent movement of the first antenna in a launch position while in a launch state when the first and second spacecraft are in a stacked configuration.

In one aspect, the first antenna is configured to be movable after launch in a deployed state to a deployed position.

In one aspect, upon substantially simultaneous deployment of the first and second spacecraft, the first antenna of the first spacecraft is released from being substantially restrained in the launch position such that the first antenna may transition into the deployed position.

In one aspect, the first antenna is configured for gimbaling when in the deployed position.

In one aspect, the launch state is a power off state, and the deployed state is a powered state.

In one aspect, the launch position is a non-deployed position.

In one aspect, the launch state is a power off state.

In one aspect, the first and second spacecraft are deployed in a single spacecraft stack release event.

In one aspect, the first and second spacecraft are powered up prior to deployment.

In one aspect, the first antenna is moveable by a gimbaling system that is controllable.

In one aspect, the gimbaling system is powered off in the launch state.

In one aspect, the first antenna is mounted to the chassis via a panel coupled to a gimbaling system, and wherein the passive restraint system includes at least one support member extending from the panel that is configured to contact the second spacecraft when the spacecraft are in a stacked configuration.

In one aspect, the passive restraint system includes a first cushioning member disposed between the first and second spacecraft when the spacecraft are in a stacked configuration.

In one aspect, the first cushioning member is defined at a distal end of the at least one support member.

In one aspect, the passive restraint system includes a second cushioning member disposed between the panel and a support arm extending from the chassis when the first antenna is in a launch position.

In one aspect, the first and second cushioning members are substantially aligned when the first antenna in a launch position and the first and second spacecraft are in a stacked configuration to sandwich the first antenna between the first and second spacecraft.

In one aspect, the gimbaling system is powered off in the launch state.

In one aspect, the gimbaling system is powered on after launch.

In one aspect, the first antenna is moveably mounted to the chassis of the first spacecraft via a gimbaling system having at least first and second degrees of freedom.

In one aspect, the first antenna is cantilevered from the chassis.

In one aspect, the passive restraint system includes at least one support member extending between the first and second spacecraft in the stacked configuration.

In one aspect, the first antenna is moveably mounted to the chassis of the first spacecraft via a gimbaling system having at least first and second degrees of freedom.

In one aspect, the passive restraint system includes at least one support member extending between the first and second spacecraft in the stacked configuration.

In one aspect, the passive restraint system includes a first cushioning member disposed between the first and second spacecraft when the spacecraft are in a stacked configuration.

In one aspect, the cushioning member is defined at a distal end of the at least one support member.

In one aspect, the passive restraint system includes a second cushioning member disposed between the panel and a support arm extending from the chassis when the first antenna is in a launch position.

In one aspect, the first and second cushioning members are substantially aligned when the first antenna in a launch position and the first and second spacecraft are in a stacked configuration to sandwich the first antenna between the first and second spacecraft.

A first spacecraft configured to be positioned adjacent a second spacecraft in a stacked configuration includes a chassis, a first antenna moveably mounted to the chassis, and a passive restraint system configured to substantially prevent movement of the first antenna in a launch position while in a launch state when the first spacecraft is positioned adjacent the second spacecraft in a stacked configuration.

In one aspect, the first antenna is configured to be movable after launch in a deployed state to a deployed position.

In one aspect, the upon substantially simultaneous deployment of the first and second spacecraft, the first antenna of the first spacecraft is released from being substantially restrained in the launch position such that the first antenna may transition into the deployed position.

In one aspect, the first antenna is configured for gimbaling when in the deployed position.

In one aspect, the launch state is a power off state, and the deployed state is a powered state.

In one aspect, the launch position is a non-deployed position.

In one aspect, the launch state is a power off state.

In one aspect, the first and second spacecraft are deployed in a single spacecraft stack release event.

In one aspect, the first and second spacecraft are powered up prior to deployment.

In one aspect, the first antenna is moveable by a gimbaling system that is controllable.

In one aspect, the gimbaling system is powered off in the launch state.

In one aspect, the first antenna is mounted to the chassis via a panel coupled to a gimbaling system, and wherein the passive restraint system includes at least one support member extending from the panel that is configured to contact the second spacecraft when the spacecraft are in a stacked configuration.

In one aspect, the gimbaling system is powered off in the launch state.

In one aspect, the gimbaling system is powered on after launch.

In one aspect, the passive restraint system includes a first cushioning member disposed between the first and second spacecraft when the spacecraft are in a stacked configuration.

In one aspect, the first cushioning member is defined at a distal end of the at least one support member.

In one aspect, the passive restraint system includes a second cushioning member disposed between the panel and a support arm extending from the chassis when the first antenna is in a launch position.

In one aspect, the first and second cushioning members are substantially aligned when the first antenna in a launch position and the first and second spacecraft are in a stacked configuration to sandwich the first antenna between the first and second spacecraft.

In one aspect, the first antenna is moveably mounted to the chassis of the first spacecraft via a gimbaling system having at least first and second degrees of freedom.

In one aspect, the first antenna is cantilevered from the chassis.

In one aspect, the passive restraint system includes at least one support member extending between the first and second spacecraft in the stacked configuration.

In one aspect, the first antenna is moveably mounted to the chassis of the first spacecraft via a gimbaling system having at least first and second degrees of freedom.

In one aspect, the passive restraint system includes at least one support member extending between the first and second spacecraft in the stacked configuration.

In one aspect, the passive restraint system includes a first cushioning member disposed between the first and second spacecraft when the spacecraft are in a stacked configuration.

In one aspect, the first cushioning member is defined at a distal end of the at least one support member.

In one aspect, the passive restraint system includes a second cushioning member disposed between a panel and a support arm extending from the chassis when the first antenna is in a launch position.

In one aspect, the first and second cushioning members are substantially aligned when the first antenna in a launch position and the first and second spacecraft are in a stacked configuration to sandwich the first antenna between the first and second spacecraft.

An antenna system of a spacecraft includes a multi-axis gimbal having at least one drive motor, a panel mounted to the multi-axis gimbal, a parabolic antenna mounted to the panel, and at least one support member extending from a first side of the panel that is configured to engage a portion of an adjacently positioned antenna system.

In one aspect, the at least one support member is a snubber having a first cushioning member defined at its tip.

In one aspect, a second cushioning member disposed on a second side of the panel that is configured to engage a support arm extending from the spacecraft.

A method of launching and releasing spacecraft from a rocket includes orienting a first antenna of a first spacecraft in a launch position, arranging a second spacecraft adjacent to the first spacecraft to define a stacked spacecraft configuration in the rocket, launching the rocket, substantially preventing movement of the first antenna in a launch state, and deploying the first and second spacecraft from the stack into space to allow movement of the first antenna into a deployed position.

In one aspect, the first spacecraft is unpowered in the launch state.

In one aspect, the method further includes powering on the first and second spacecraft subsequent to launching the rocket.

In one aspect, the method further includes deploying the first antenna with a gimbal mechanism.

In one aspect, the method further includes deploying the first and second spacecraft in a single spacecraft stack release event.

The embodiments of the disclosure in which an exclusive property or privilege is claimed are defined as follows:

1. A spacecraft system, comprising:
  a first spacecraft having a chassis and a first antenna moveably mounted to the chassis;
  a second spacecraft having a chassis, wherein the second spacecraft is adjacent the first spacecraft during launch to define a stacked configuration; and
  a passive restraint system defined between the first and second spacecraft that is configured to substantially prevent movement of the first antenna in a launch position while in a launch state when the first and second spacecraft are in the stacked configuration, wherein the passive restraint system includes a first support member having a first end portion coupled to the chassis of the first spacecraft and a second end portion coupled to the first antenna and disposed between the chassis of the first spacecraft and the first antenna when the first antenna is in the launch position, and a second support member directly coupled to the first support member and extending to the second spacecraft.

2. The spacecraft system of claim 1, wherein the first antenna is configured to be movable after launch in a deployed state to a deployed position.

3. The spacecraft system of claim 2, wherein upon substantially simultaneous deployment of the first and second spacecraft, the first antenna of the first spacecraft is released from being substantially restrained in the launch position such that the first antenna may transition into the deployed position.

4. The spacecraft system of claim 3, wherein the first and second spacecraft are powered up prior to deployment.

5. The spacecraft system of claim 2, wherein the launch state is a power off state, and the deployed state is a powered state.

6. The spacecraft system of claim 1, wherein the launch state is a power off state.

7. The spacecraft system of claim 1, wherein the first and second spacecraft are deployed in a single spacecraft stack release event.

8. A first spacecraft configured to be positioned adjacent a second spacecraft in a stacked configuration, the first spacecraft comprising:
a chassis;
a first antenna moveably mounted to the chassis, wherein the first antenna is configured to transition from a first, launch position to a second, deployed position; and
a passive restraint system configured to substantially prevent movement of the first antenna in the first, launch position while in a launch state when the first spacecraft is positioned adjacent the second spacecraft in the stacked configuration, wherein the passive restraint system includes a first support member coupled to the first antenna and disposed between the chassis and the first antenna when the first antenna is in the first, launch position, and a second support member directly coupled to the first support member and extending to the second spacecraft.

9. The first spacecraft of claim 8, wherein upon substantially simultaneous deployment of the first and second spacecraft, the first antenna of the first spacecraft is released from being substantially restrained in the first, launch position such that the first antenna may transition into the second, deployed position.

10. The first spacecraft of claim 8, wherein the launch state is a power off state, and the deployed state is a powered state.

11. The first spacecraft of claim 8, wherein the launch state is a power off state.

12. The first spacecraft of claim 8, wherein the first antenna is moveable by a gimbaling system that is controllable.

13. The first spacecraft of claim 12, wherein the gimbaling system is powered off in the launch state.

14. A method of launching and releasing spacecraft from a rocket, the method comprising:
orienting a first antenna of a first spacecraft in a launch position, wherein the first spacecraft includes a chassis coupled to the first antenna;
arranging a second spacecraft adjacent to the first spacecraft to define a stacked spacecraft configuration in the rocket, wherein a passive restraint system is defined between the first and second spacecraft when the first and second spacecraft are in the stacked spacecraft configuration, and wherein the passive restraint system includes a first support member having a first end portion coupled to the chassis of the first spacecraft and a second end portion coupled to the first antenna and disposed between the chassis and the first antenna when the first antenna is in the launch position, and a second support member directly coupled to the first support member and extending to the second spacecraft;
launching the rocket;
substantially preventing movement of the first antenna in a launch state; and
deploying the first and second spacecraft from the stack into space to allow movement of the first antenna into a deployed position.

15. The method of claim 14, wherein the first spacecraft is unpowered in the launch state.

16. The method of claim 15, further comprising powering on the first and second spacecraft subsequent to launching the rocket.

17. The method of claim 14, further comprising moving the first antenna into the deployed position by a gimbaling system that is controllable.

* * * * *